(12) United States Patent
Motaparti et al.

(10) Patent No.: US 10,365,727 B2
(45) Date of Patent: Jul. 30, 2019

(54) HUMAN-TO-MOBILE INTERFACES

(75) Inventors: Sunil Motaparti, Glasgow (GB);
Sanjay Patel, Thornton Heath (GB)

(73) Assignee: Keypoint Technologies (UK) Limited, Glasgow (GB)

( * ) Notice: Subject to any disclaimer, the term of this patent is extended or adjusted under 35 U.S.C. 154(b) by 1512 days.

(21) Appl. No.: 11/887,023

(22) PCT Filed: Mar. 23, 2006

(86) PCT No.: PCT/GB2006/001097
§ 371 (c)(1),
(2), (4) Date: Mar. 17, 2008

(87) PCT Pub. No.: WO2006/100509
PCT Pub. Date: Sep. 28, 2006

(65) Prior Publication Data
US 2008/0266263 A1 Oct. 30, 2008

(30) Foreign Application Priority Data
Mar. 23, 2005 (GB) .................................. 0505941.5

(51) Int. Cl.
*G06F 3/023* (2006.01)
*G06F 3/0488* (2013.01)
*G06F 17/27* (2006.01)

(52) U.S. Cl.
CPC ........ *G06F 3/0237* (2013.01); *G06F 3/04886* (2013.01); *G06F 17/276* (2013.01)

(58) Field of Classification Search
CPC ... G06F 3/0237; G06F 17/276; G06F 3/04886
See application file for complete search history.

(56) References Cited

U.S. PATENT DOCUMENTS 3,226,712 A   12/1965  Lens et al. .................... 340/365
3,557,927 A *  1/1971  Wright et al. ................... 400/94
(Continued)

FOREIGN PATENT DOCUMENTS

AU   2004200059    7/2005
CA   2 454 028     6/2005
(Continued)

OTHER PUBLICATIONS

"HMS: A Predictive Text Entry Method Using Bigrams" by Jon Hasselgren et al., Proceedings of the Workshop on Language Modeling for Text Entry Methods, pp. 43-49, Apr. 14, 2003 (Hasselgren).*

(Continued)

*Primary Examiner* — Mandrita Brahmachari
*Assistant Examiner* — Bille M Dahir
(74) *Attorney, Agent, or Firm* — Brinks Gilson & Lione

(57) ABSTRACT

A method of character recognition for a personal computing device comprising a user interface capable of receiving inputs that are to be recognized through data input means which are receptive to keyed, tapped or a stylus input, said device being adapted to facilitate a reduction in the number of physical keying actions, tapping actions or gestures required to create a data string to less than the number of characters within said data string: storing a set of data strings each with a priority indicator associated therewith, wherein the indicator is a measure of a plurality of derivatives associated with the data string; recognizing an event; looking up the most likely subsequent data string to follow the event from the set of data strings based on one or more of the plurality of derivatives; ordering the data strings for display based on the priority indicator of that data string.

25 Claims, 21 Drawing Sheets

| Word: | Key x Taps (letter obtained) | | | | | | | |
|---|---|---|---|---|---|---|---|---|
| Dear | D x 1 (D) | e x 1 (e) | a x 1 (a) | r x 1 (r) | | | | |
| Friend | F x 1 (F) | r x 1 (r) | i x 1 (i) | e x 1 (e) | n x 1 (n) | d x 1 (d) | | |
| Please | P x 1 (P) | l x 1 (l) | e x 1 (e) | a x 1 (a) | s x 1 (s) | e x 1 (e) | | |
| call | c x 1 (c) | a x 1 (a) | l x 1 (l) | l x 1 (l) | | | | |
| me | m x 1 (m) | e x 1 (e) | | | | | | |
| as | a x 1 (a) | s x 1 (s) | | | | | | |
| soon | s x 1 (s) | o x 1 (o) | o x 1 (o) | n x 1 (n) | | | | |
| as | a x 1 (a) | s x 1 (s) | | | | | | |
| possible | p x 1 (p) | o x 1 (o) | s x 1 (s) | s x 1 (s) | i x 1 (i) | b x 1 (b) | l x 1 (l) | 3 x 2 (e) |
| to | t x 1 (t) | o x 1 (o) | | | | | | |
| fix | f x 1 (f) | i x 1 (i) | x x 1 (x) | | | | | |
| A | a x 1 (a) | | | | | | | |
| date | d x 1 (d) | a x 1 (a) | t x 1 (t) | e x 1 (e) | | | | |
| for | f x 1 (f) | o x 1 (o) | r x 1 (r) | | | | | |
| another | a x 1 (a) | n x 1 (n) | o x 1 (o) | t x 1 (t) | h x 1 (h) | e x 1 (e) | r x 1 (r) | |
| meeting | m x 1 (m) | e x 1 (e) | e x 1 (e) | t x 1 (t) | i x 1 (i) | n x 1 (n) | g x 1 (g) | |
| Conventionally: | 4+6+6+4+2+2+4+2+8+2+3+1+4+3+7+7+19=84 | | | - i.e summation of key taps for each word | | | | |
| Actual Length: | 4+6+6+4+2+2+4+2+8+2+3+1+4+3+7+7+16=81 | | | - i.e summation of actual lengths of each word | | | | |
| Excess Taps: | 84 - 81 = +3 | | | - i.e 3 extra key taps than actual length | | | | |

(56) References Cited

U.S. PATENT DOCUMENTS

| | | | |
|---|---|---|---|
| 3,648,245 A | 3/1972 | Dodds, Jr. et al. | |
| 3,929,216 A | 12/1975 | Einbinder | 197/100 |
| 3,940,758 A | 2/1976 | Margolin | 340/337 |
| 4,459,049 A * | 7/1984 | Howell et al. | 400/98 |
| 4,483,634 A | 11/1984 | Frey et al. | 400/489 |
| 4,824,268 A | 4/1989 | Diernisse | 400/486 |
| 4,931,935 A | 6/1990 | Ohira et al. | |
| 5,017,030 A | 5/1991 | Crews | 400/485 |
| 5,031,206 A * | 7/1991 | Riskin | 379/93.27 |
| 5,073,050 A | 12/1991 | Andrews | 400/82 |
| 5,122,786 A | 6/1992 | Rader | 340/711 |
| 5,137,384 A | 8/1992 | Spencer et al. | 400/489 |
| 5,178,477 A | 1/1993 | Gambaro | 400/489 |
| 5,187,644 A | 2/1993 | Crisan | 361/393 |
| 5,210,689 A * | 5/1993 | Baker et al. | 704/1 |
| 5,318,367 A | 6/1994 | Braun et al. | 400/82 |
| 5,332,322 A | 7/1994 | Gambaro | 400/489 |
| 5,360,280 A | 11/1994 | Camacho et al. | 400/489 |
| 5,372,441 A | 12/1994 | Louis | 400/489 |
| 5,397,189 A | 3/1995 | Minogue | 400/489 |
| 5,426,449 A | 6/1995 | Danziger | 345/168 |
| 5,503,484 A | 4/1996 | Louis | 400/489 |
| 5,543,790 A | 8/1996 | Goldstein | 341/22 |
| 5,553,953 A | 9/1996 | Herman et al. | 400/489 |
| 5,610,602 A | 3/1997 | Hargreaves | 341/22 |
| 5,612,691 A | 3/1997 | Murmann et al. | 341/22 |
| 5,620,267 A | 4/1997 | Klauber | 400/486 |
| 5,660,488 A | 8/1997 | Miller | 400/486 |
| 5,673,040 A | 9/1997 | Hargreaves et al. | 341/22 |
| 5,680,511 A | 10/1997 | Baker et al. | |
| 5,689,253 A | 11/1997 | Hargreaves et al. | 341/22 |
| 5,716,149 A | 2/1998 | Mensick | 400/489 |
| 5,731,808 A | 3/1998 | Gaither | 345/168 |
| 5,775,822 A | 7/1998 | Cheng | 400/489 |
| 5,788,195 A | 8/1998 | Rice | 248/118.5 |
| 5,788,386 A | 8/1998 | Hayashi et al. | 400/489 |
| 5,790,103 A | 8/1998 | Willner | 345/168 |
| 5,805,911 A | 9/1998 | Miller | |
| 5,818,437 A | 10/1998 | Grover et al. | 345/326 |
| 5,828,323 A | 10/1998 | Bartet | 341/22 |
| 5,829,000 A | 10/1998 | Huang | |
| 5,896,321 A * | 4/1999 | Miller | G06F 3/023 365/189.15 |
| 5,952,942 A | 9/1999 | Balakrishnan et al. | |
| 5,959,629 A * | 9/1999 | Masui | 715/808 |
| 5,959,948 A | 9/1999 | Oshima | |
| 5,971,636 A | 10/1999 | Mensick | 400/489 |
| 5,995,084 A | 11/1999 | Chan | |
| 6,005,495 A * | 12/1999 | Connolly et al. | 341/22 |
| 6,005,496 A | 12/1999 | Hargreaves et al. | 341/22 |
| 6,011,495 A | 1/2000 | Chen | 341/22 |
| 6,022,156 A | 2/2000 | Blish | 400/472 |
| 6,031,469 A | 2/2000 | Dodd | 341/22 |
| 6,084,576 A | 7/2000 | Leu et al. | 345/168 |
| 6,088,022 A | 7/2000 | Rakoski | 345/168 |
| 6,114,977 A | 9/2000 | Smith et al. | 341/22 |
| 6,132,118 A | 10/2000 | Grezeszak | 400/489 |
| 6,147,673 A | 11/2000 | Zarek | 345/156 |
| 6,198,474 B1 | 3/2001 | Roylance | 345/168 |
| 6,204,848 B1 | 3/2001 | Nowlan et al. | 345/352 |
| 6,224,279 B1 | 5/2001 | Nielsen et al. | 400/495 |
| 6,286,064 B1 | 9/2001 | King et al. | 710/67 |
| 6,573,844 B1 | 6/2003 | Venolia et al. | |
| 6,616,703 B1 | 9/2003 | Nakagawa | |
| 6,712,534 B2 | 3/2004 | Patel | 400/486 |
| 6,801,190 B1 | 10/2004 | Robinson et al. | 345/173 |
| 7,124,080 B2 | 10/2006 | Chen et al. | |
| 7,165,019 B1 | 1/2007 | Lee et al. | |
| 7,296,229 B2 | 11/2007 | Berstis | |
| 7,475,343 B1 * | 1/2009 | Mielenhausen | G06F 17/24 715/261 |
| 7,503,001 B1 * | 3/2009 | Lekutai | 715/261 |
| 7,912,706 B2 | 3/2011 | Sparre | |
| 7,953,692 B2 | 5/2011 | Bower et al. | |
| 8,036,878 B2 | 10/2011 | Assadollahi | |
| 8,073,835 B2 | 12/2011 | Lowles et al. | |
| 8,188,978 B2 | 5/2012 | Fux et al. | |
| 8,713,432 B2 | 4/2014 | Assadollahi | |
| 8,930,181 B2 | 1/2015 | Parikh | |
| 9,020,935 B2 | 4/2015 | Lowles et al. | |
| 9,274,551 B2 | 3/2016 | Su et al. | |
| 2001/0009009 A1 | 7/2001 | Iizuka | |
| 2002/0038207 A1 | 3/2002 | Mori et al. | |
| 2002/0186883 A1 | 12/2002 | Roman | |
| 2003/0011574 A1 | 1/2003 | Goodman | |
| 2003/0016985 A1 | 1/2003 | Patel | |
| 2003/0017844 A1 | 1/2003 | Yu | |
| 2003/0023420 A1 | 1/2003 | Goodman | |
| 2003/0093263 A1 | 5/2003 | Chen et al. | |
| 2003/0104839 A1 * | 6/2003 | Kraft et al. | 455/566 |
| 2003/0195904 A1 | 10/2003 | Chestnut et al. | |
| 2003/0197736 A1 | 10/2003 | Murphy | |
| 2004/0021691 A1 * | 2/2004 | Dostie | G06F 3/0237 715/773 |
| 2004/0140956 A1 * | 7/2004 | Kushler et al. | 345/168 |
| 2004/0153975 A1 * | 8/2004 | Williams et al. | 715/531 |
| 2004/0169635 A1 | 9/2004 | Ghassabian | |
| 2004/0201607 A1 | 10/2004 | Mulvey et al. | |
| 2005/0017954 A1 | 1/2005 | Kay et al. | |
| 2005/0114770 A1 * | 5/2005 | Sacher | G06F 17/276 715/261 |
| 2005/0192792 A1 | 9/2005 | Carus et al. | |
| 2005/0210020 A1 | 9/2005 | Gunn et al. | |
| 2005/0210402 A1 * | 9/2005 | Gunn et al. | 715/773 |
| 2005/0246365 A1 | 11/2005 | Lowles et al. | |
| 2006/0156233 A1 | 7/2006 | Nurmi | |
| 2006/0265208 A1 * | 11/2006 | Assadollahi | G06F 3/0237 704/9 |
| 2007/0040813 A1 | 2/2007 | Kushler et al. | |
| 2007/0061301 A1 | 3/2007 | Ramer et al. | |
| 2007/0216651 A1 | 9/2007 | Patel | |
| 2007/0233463 A1 | 10/2007 | Sparre | |
| 2008/0266263 A1 | 10/2008 | Motaparti et al. | |
| 2008/0313182 A1 | 12/2008 | Vasa | |
| 2009/0055732 A1 | 2/2009 | Motaparti et al. | |
| 2009/0150322 A1 | 6/2009 | Bower | |

FOREIGN PATENT DOCUMENTS

| | | |
|---|---|---|
| DE | 34 09 980 | 9/1985 |
| DE | 43 04 470 | 8/1994 |
| EP | 0 538 329 | 1/1992 |
| EP | 0 768 598 | 4/1997 |
| EP | 0 810 513 | 12/1997 |
| FR | 2 655 911 | 6/1991 |
| GB | 2 154 948 | 9/1985 |
| GB | 2 378 420 | 2/2003 |
| WO | WO 92/00851 | 1/1992 |
| WO | WO 98/33111 | 7/1998 |
| WO | WO 01/27732 | 4/2001 |
| WO | WO 03/060451 | 7/2003 |
| WO | WO 2004/010323 A2 | 1/2004 |
| WO | WO 2005/093555 | 10/2005 |
| WO | WO 2006/100505 | 9/2006 |
| WO | WO 2006/100509 | 9/2006 |

OTHER PUBLICATIONS

"A Commonsense Approach to Predictive Text Entry" by Tom Stocky et al, CHI 2004, Apr. 24-29, 2004, Vienna, Austria.*

"Comparing the Immediate Usability of Graffiti 2 and Virtual Keyboard" by Thomas Koltringer et al, CHI 2004, Apr. 24-29, 2004, Vienna, Austria.*

"Associative array", Wikipedia, Feb. 24, 2004, downloaded Nov. 27, 2012 from http://en.wikipedia.org/w/index.php?title=Associative_array&oldid=2823416.*

Donald Plew & Ryan Stephens,"The Database Normalization Process", Jan. 24, 2003, informIT.*

"Associative array", by Wikipedia, Feb. 24, 2004, downloaded from http://en.wikipedia.org/w/index.php?title=Associative_array&oldid=2823416.*

(56) References Cited

OTHER PUBLICATIONS

Official Action, Application No. RU2006133906, filing date, Sep. 22, 2006, applicant, Keypoint Technologies (UK) Limited.
International Search Report and Written Opinion for PCT/GB2006/001090 dated Mar. 5, 2007.
Hobday, "A keyboard to increase productivity and reduce postural stress," Paper presented at: The Annual International Industrial Ergonomics and Safety Conference, Jun. 8-10, 1988, New Orleans. *Trends in Ergonomics/Human Factors* V 321-330 http://www.maltron.com/recognitia/script.html.
Non-Final Rejection dated Apr. 27, 2011 for U.S. Appl. No. 10/593,833, filed Sep. 22, 2006 (Inventor-Patel et al.).
Acknowledgement of Receipt of EPO Form 2008+2906, Preparation for oral proceedings—Instructions to Support Service, and Summons for Oral Proceedings, dated May 3, 2012 by the European Patent Office for European Patent Application No. 05729287.2 (European Publication No. 1733298) filed Mar. 23, 2005 (Applicant—Keypoint Technologies // 1st Named Inventor—Patel), 8 pages.
Amendment after Final Rejection filed Jan. 6, 2012 with the USPTO or U.S. Appl. No. 10/593,833, filed Sep. 22, 2006 (1st Named Inventor—Patel), 11 pages.
Amendment and Response to Office Action filed Apr. 5, 2012 to the United States Patent and Trademark Office for U.S. Appl. No. 11/887,019 filed Mar. 17, 2008 (Applicant—Keypoint Technologies // 1st Named Inventor—Motaparti, et al., 18 pages.
Amendment and Response to Office Action filed Nov. 21, 2012 to the United States Patent and Trademark Office for U.S. Appl. No. 11/887,019 filed Mar. 17, 2008 (Applicant—Keypoint Technologies // 1st Named Inventor—Motaparti, et al.;), 55 pages.
Amendment and Response to Office Action filed Sep. 25, 2012 to the United States Patent and Trademark Office for U.S. Appl. No. 10/593,833, filed Sep. 22, 2006 (Applicant—Keypoint Technologies // Inventor—Patel), pp. 1-11.
Applicant-Initiated Interview Summary filed Feb. 16, 2012 with the USPTO for U.S. Appl. No. 10/593,833, filed Sep. 22, 2006 (1st Named Inventor—Patel), 3 pages.
Burgess and Lund, Modelling Parsing Constraints with High-Dimensional Context Space, Language and Cognitive Processes, 1997, 12(2/3), 177-210 (18 pages).
C. E. Shannon, A Mathematical Theory of Communication, The Bell System Technical Journal, vol. 27, pp. 379-423, 623-656, July, Oct. 1948 (55 pages).
Claims Amendment filed Dec. 12, 2006 with the European Patent Office for EP 1 733 298 filed Mar. 23, 2005 (Applicant—Keypoint Technologies // 1st Named Inventor—Patel), 3 pages.
Communication pursuant to Article 94(3) EPC issued Apr. 27, 2010 by the European Patent Office for European Patent Application No. 06726503.3 (European Publication No. 1861768) filed Mar. 23, 2006 (Applicant—Keypoint Technologies // 1st Named Inventor—Motaparti), 3 pages.
Communication pursuant to Article 94(3) EPC issued Apr. 27, 2010 by the European Patent Office for European Patent Application No. 06726508.2 (European Publication No. 1861769) filed Mar. 23, 2006 (Applicant—Keypoint Technologies // 1st Named Inventor—Motaparti), 3 pages.
Communication pursuant to Article 94(3) EPC issued Sep. 28, 2009 by the European Patent Office for European Patent Application No. 05729287.2 (European Publication No. 1733298) filed Mar. 23, 2005 (Applicant-Keypoint Technologies // 1st Named Inventor-Patel, 5 pages.
Reasons for failure of Main Request to comply with EPC and Annex to EPO Form 2004, Communication pursuant to Rule 71(3) EPC issued Jan. 23, 2013 by the European Patent Office for European Patent Application No. 05729287.2 (European Publication No. 1733298) filed Mar. 23, 2005 (Applicant-Keypoint Technologies // Inventor-Patel), pp. 1-4.
Decision on the request for further processing under Rule 135(3) EPC issued Mar. 9, 2011 by the European Patent Office for the European Patent Application No. 06726503.3 (European Publication No. 1861768) filed Mar. 23, 2006 (Applicant—Keypoint Technologies // 1st Named Inventor—Motaparti), 1 page.
Decision on the request for further processing under Rule 135(3) EPC issued Mar. 9, 2011 by the European Patent Office for the European Patent Application No. 06726508.2 (European Publication No. 1861769) filed Mar. 23, 2006 (Applicant—Keypoint Technologies // 1st Named Inventor—Motaparti), 1 page.
Examination Report dated Dec. 18, 2008 by the Intellectual Property Office of New Zealand for Patent Application No. NZ 549779 filed Mar. 23, 2005 (Applicant—Keypoint Technologies // 1st Named Inventor—Patel), 2 pages.
Examination Report dated May 22, 2007 by the Intellectual Property Office of New Zealand for Patent Application No. NZ 549779 filed Mar. 23, 2005 (Applicant—Keypoint Technologies // 1st Named Inventor—Patel), 2 pages.
Examination Report dated Nov. 26, 2008 by the Intellectual Property Office of New Zealand for Patent Application No. NZ 549779 filed Mar. 23, 2005 (Applicant—Keypoint Technologies // 1st Named Inventor—Patel), 2 pages.
Final Rejection dated May 22, 2012 by the United States Patent and Trademark Office for U.S. Appl. No. 11/887,019, filed Mar. 17, 2008 (Applicant—Keypoint Technologies // 1st Named Inventor—Motaparti, et al.) 23 pages.
Final Rejection dated Nov. 10, 2011 by the USPTO for U.S. Appl. No. 10/593,833, filed Sep. 22, 2006 (1st Named Inventor—Patel), 18 pages.
Final Rejection dated Oct. 12, 2012 by the United States Patent and Trademark Office for U.S. Appl. No. 10/593,833, filed Sep. 22, 2006 (Applicant—Keypoint Technologies // Inventor—Patel), 16 pages.
Maintenance/Change of Date/Cancellation of oral proceedings arranged for day Sep. 19, 2012 at 9.00 hrs, dated Aug. 20, 2012 by the European Patent Office for European Patent Application No. 05729287.2 (European Publication No. 1733298) filed Mar. 23, 2005 (Applicant—Keypoint Technologies // 1st Named Inventor—Patel), 2 pages.
Gorokhov, "Radio electronics glossary," Moscow, "Russian Language," D3, 1993, cover and pp. 180-181, including English translation.
Communication under Rule 71(3) EPC with Amendment to the Application issued Jan. 23, 2013 by the European Patent Office for pp. 1-4.European Patent Application No. 05729287.2 (European Publication No. 1733298) filed Mar. 23, 2005 (Applicant—Keypoint Technologies // Inventor—Patel), 135 pages.
International Preliminary Report on Patentability dated Jul. 26, 2007 by the International Bureau for PCT/GB2006/001090 filed Mar. 23, 2006 and published as WO 2006/100505 on Sep. 28, 2006 (Applicant—Keypoint Technologies // 1st Named Inventor—Motaparti), 14 pages.
International Preliminary Report on Patentability dated Jul. 26, 2007 by the International Bureau for PCT/GB2006/001097 filed Mar. 23, 2006 and published as Wo 2006/100509 on Sep. 28, 2006 (Applicant—Keypoint Technologies // 1st Named Inventor—Motaparti), 16 pages.
International Preliminary Report on Patentability dated Sep. 26, 2006 by the International Bureau for PCT/GB2005/001111 filed Mar. 23, 2005 and published as WO 2005/093555 on Oct. 6, 2005 (Applicant—Keypoint Technologies // 1st Named Inventor—Patel), 6 pages.
International Search Report issued by the International Searching Authority on Mar. 5, 2007 for PCT/GB2006/001097 filed on Mar. 23, 2006 and published as WO 2006/100509 on Sep. 28, 2006 (Applicant—Keypoint Technologies // 1st Named Inventor—Motaparti), 3 pages.
International Search Report dated Nov. 9, 2005 by the International Searching Authority for PCT/GB2005/00111 filed Mar. 23, 2005 and published as WO 2005/093555 on Oct. 6, 2005 (Applicant—Keypoint Technologies // 1st Named Inventor—Patel), 2 pages.
International Search Report dated Nov. 9, 2005 by the International Searching Authority for PCT/GB2005/001111 filed Mar. 23, 2005 and published as WO 2005/093555 on Oct. 6, 2005 (Applicant—Keypoint Technologies // 1st Named Inventor—Patel), 2 pages.
International Search Report dated Mar. 5, 2007 by the International Searching Authority for PCT/GB2006/001090 filed Mar. 23, 2006

(56) References Cited

OTHER PUBLICATIONS and published as WO 2006/100505 on Sep. 28, 2006 (Applicant—Keypoint Technologies // Inventor—Motaparti), 3 pages.
Minutes of the Oral Proceedings dated Dec. 18, 2012 by the European Patent Office for European Patent Application No. 05729287.2 (European Publication No. 1733298) filed Mar. 23, 2005 (Applicant—Keypoint Technologies // Inventor—Patel), pp. 1-16.
Non-Final Rejection dated Oct. 5, 2011 by the United States Patent and Trademark Office for U.S. Appl. No. 11/887,019, filed Mar. 17, 2008 (Applicant—Keypoint Technologies // 1st Named Inventor—Motaparti, et al.), 22 pages.
Non-Final Rejection dated Apr. 27, 2011 by the USPTO for U.S. Appl. No. 10/593,833, filed Sep. 22, 2006 (1st Named Inventor—Patel), 19 pages.
Non-Final Rejection dated Mar. 30, 2012 by the USPTO for U.S. Appl. No. 10/593,883, filed Sep. 22, 2006 (1st Named Inventor—Patel), 16 pages.
Notice of Allowance dated Dec. 15, 2015 for Canadian Patent Application No. 2,601,305, 1 page.
Noting of Loss of Rights pursuant to Rule 69(1) EPC, issued Feb. 5, 2007 by the European Patent Office for European Patent Application No. 05729287.2 (European Publication No. 1733298) filed Mar. 23, 2005 (Applicant—Keypoint Technologies // 1st Named Inventor—Patel), 1 page.
Noting of loss of Rights pursuant to Rule 112(1) EPC, issued Dec. 14, 2010 by the European Patent Office for European Patent Application No. 06726503.3 (European Publication No. 1861768) filed Mar. 23, 2006 (Applicant—Keypoint Technologies // 1st Named Inventor—Motaparti), 1 page.
Noting of loss of rights pursuant to Rule 112(1) EPC, issued Dec. 14, 2010 by the European Patent Office for European Patent Application No. 06726508.2 (European Pubilcation No. 1861769) filed Mar. 23, 2016 (Applicant—Keypoint Technologies // 1st Named Inventor—Motaparti), 1 page.
Office Action dated Feb. 3, 2015 for Canadian Patent Application No. 2,561,218, 8 pages.
Office Action dated Feb. 15, 2014 for Indian Patent Application No. 5300/DELNP/2006, 2 pages.
Office Action dated May 12, 2015 for Indian Patent Application No. 7606/DELNP/2007, 3 pages.
Office Action dated May 26, 2015 for Indian Patent Application No. 7608/DELNP/2007, 3 pages.
Office Action dated Nov. 3, 2015 for Canadian Patent Application No. 2,601,303, 2 pages.
Office Action dated Oct. 8, 2014 for Canadian Patent Application No. 2,601,305, 5 pages.
Examination Report dated Feb. 2, 2009 for Singapore Patent Application No. 200606600-5 filed Mar. 23, 2005 (Applicant—Keypoint Technologies // st Named Inventor—Patel), 5 pages.
Russian Office Action dated Mar. 18, 2009 by the Russian Patent Office for Russian Patent Application No. 2006133906/09 (036880) entered into national stage on Sep. 22, 2006 from PCT/GB2005/001111 filed on Mar. 23, 2005 (Applicant—Keypoint Technologies // 1st Named Inventor—Patel) (both Russian language Office Action (pp. 1-3) and the English translation (pp. 4-7) are provided), 7 pages.
Preliminary Amendment filed Sep. 22, 2006 with the USPTO for U.S. Appl. No. 10/593,833, filed Sep. 22, 2006 (1st Named Inventor—Patel), 13 pages.
Preliminary Amendment filed Sep. 24, 2007 to the United States Patent and Trademark Office for U.S. Appl. No. 11/887,019 filed Mar. 17, 2008 (Applicant—Keypoint Technologies // 1st Named Inventor—Motaparti, et al.), 12 pages.
Reply to Communication from the Examining Division filed Apr. 8, 2010 to the European Patent Office for European Patent Application No. 05729287.2 (European Publication No. 1733298) filed Mar. 23, 2005 (Applicant—Keypoint Technologies // 1st Named Inventor—Patel), 19 pages.
Request for Further Processing dated Feb. 23, 2011 submitted to the European Patent Office (received at the EPO on Feb. 24, 2011) for European Patent Application No. 06726508.2 (European Publication No. 1861769) filed Mar. 23, 2006 (Applicant—Keyboard Technologies // 1st Named Inventor—Motaparti), 22 pages.
Request for Further Processing dated Feb. 23, 2011 with the European Patent Office for European Patent Application No. 06726503.3 (received at the EPO on Feb. 24, 2011) (European Publication No. 1861768) filed Mar. 23, 2006 (Applicant—Keypoint Technologies // 1st Named Inventor—Motaparti), 21 pages.
Requirement for Restriction/Election dated Nov. 23, 2010 by the USPTO for U.S. Appl. No. 10/593,833, filed Sep. 22, 2006 (1st Named Inventor—Patel), 5 pages.
Response to Non-Final Rejection filed Aug. 23, 2011 filed with the USPTO for U.S. Appl. No. 10/593,833, filed Sep. 22, 2006 (1st Named Inventor—Patel), 13 pages.
Response to Notice of Non-Compliant Amendment filed Oct. 1, 2012 to the United States Patent and Trademark Office for U.S. Appl. No. 10/593,833, filed Sep. 22, 2006 (Applicant—Keypoint Technologies // Inventor—Patel), pp. 1-12.
Response to Official Action dated Apr. 8, 2015 for Canadian Patent Application No. 2,601,305, 8 pages.
Response to Official Action filed Jul. 31, 2015 for Canadian Patent Application No. 2,561,218, 6 pages.
Response to Office Action filed Sep. 22, 2014 for Indian Patent Application No. 5300/DELNP/2006, 10 pages.
Response to Requirement for Restriction/Election filed Feb. 22, 2011 with the USPTO for U.S. Appl. No. 10/593,833, filed Sep. 22, 2006 (1st Named Inventor—Patel), 2 pages.
Submission in Preparation to Oral Proceedings dated Aug. 17, 2012 to the European Patent Office for European Patent Application No. 05729287.2 (European Publication No. 1733298) filed Mar. 23, 2005 (Applicant—Keyboard Technologies // 1st Named Inventor—Patel), 18 pages.
Consultation by Telephone issued Feb. 6, 2007 by the European Patent Office for European Patent Application No. 05729287.2 (European Publication No. 1733298) filed Mar. 23, 2005 (Applicant—Keypoint Technologies // 1st Named Inventor—Patel), 1 page.
Written Opinion dated Nov. 7, 2005 by the International Searching Authority for PCT/GB2005/001111 filed Mar. 23, 2005 and published as WO 2005/093555 on Oct. 6, 2005 (Applicant—Keypoint Technologies // 1st Named Inventor—Patel), 5 pages.
Written Opinion dated Sep. 23, 2007 by the International Searching Authority for PCT/GB2006/001090 filed Mar. 23, 2006 and published as WO 2006/100505 on Sep. 28, 2006 (Applicant—Keypoint Technologies // Inventor—Motaparti), pp. 1-11.
Written Opinion dated Sep. 23, 2007 by the International Searching Authority for PCT/GB2006/001097 filed Mar. 23, 2006 and published as WO 2006/100509 on Sep. 28, 2006 (Applicant—Keypoint Technologies // Inventor—Motaparti), pp. 1-11.
Kenneth Ward Church et al., "Word Association Norms, Mutual Information, and Lexicography" *Computation Linguistics,* vol. 16, No. 1, Mar. 1990, pp. 22-29.

* cited by examiner

| Fn | 1 | 2 | 3 | 4 | 5 | 6 | 7 | 8 | 9 | 0 | BSpc |
|----|---|---|---|---|---|---|---|---|---|---|------|
| Tab | Q | W | E | R | T | Y | U | I | O | P | " |
| Caps | A | S | D | F | G | H | J | K | L | Enter | |
| Shift | | Z | X | C | V | B | N | M | , | . | Shift |
| | | | | | Space | | | | | | |

Example Simple / Basic Touch-screen Keyboard

*Fig. 1a*

| ¬ | ! | " | £ | 7 | 8 | 9 | $ | % | ^ | & |
|---|---|---|---|---|---|---|---|---|---|---|
| ` | * | ( | ) | 4 | 5 | 6 | - | + | _ | = |
| \ | < | { | } | 1 | 2 | 3 | : | @ | ~ | ? |
| \| | > | [ | ] | . | 0 | , | ; | ' | # | / |

Example Simple / Basic Numeric and Conventional
Symbols Touch-screen Keyboard

*Fig. 1b*

| Word: | Key x Taps (letter obtained) | | | | | | | |
|---|---|---|---|---|---|---|---|---|
| Dear | D x 1 (D) | e x 1 (e) | a x 1 (a) | r x 1 (r) | | | | |
| Friend | F x 1 (F) | r x 1 (r) | i x 1 (i) | e x 1 (e) | n x 1 (n) | d x 1 (d) | | |
| Please | P x 1 (P) | l x 1 (l) | e x 1 (e) | a x 1 (a) | s x 1 (s) | e x 1 (e) | | |
| call | c x 1 (c) | a x 1 (a) | l x 1 (l) | l x 1 (l) | | | | |
| me | m x 1 (m) | e x 1 (e) | | | | | | |
| as | a x 1 (a) | s x 1 (s) | | | | | | |
| soon | s x 1 (s) | o x 1 (o) | o x 1 (o) | n x 1 (n) | | | | |
| as | a x 1 (a) | s x 1 (s) | | | | | | |
| possible | p x 1 (p) | o x 1 (o) | s x 1 (s) | s x 1 (s) | i x 1 (i) | b x 1 (b) | l x 1 (l) | 3 x 2 (e) |
| to | t x 1 (t) | o x 1 (o) | | | | | | |
| fix | f x 1 (f) | i x 1 (i) | x x 1 (x) | | | | | |
| A | a x 1 (a) | | | | | | | |
| date | d x 1 (d) | a x 1 (a) | t x 1 (t) | e x 1 (e) | | | | |
| for | f x 1 (f) | o x 1 (o) | r x 1 (r) | | | | | |
| another | a x 1 (a) | n x 1 (n) | o x 1 (o) | t x 1 (t) | h x 1 (h) | e x 1 (e) | r x 1 (r) | |
| meeting | m x 1 (m) | e x 1 (e) | e x 1 (e) | t x 1 (t) | i x 1 (i) | n x 1 (n) | g x 1 (g) | |
| Conventionally: | 4+6+6+4+2+2+4+2+8+2+3+1+4+3+7+7+19=84 | | | | | | - i.e summation of key taps for each word | |
| Actual Length: | 4+6+6+4+2+2+4+2+8+2+3+1+4+3+7+7+16=81 | | | | | | - i.e summation of actual lengths of each word | |
| Excess Taps: | 84 − 81 = +3 | | | | | | - i.e 3 extra key taps than actual length | |

Fig. 2

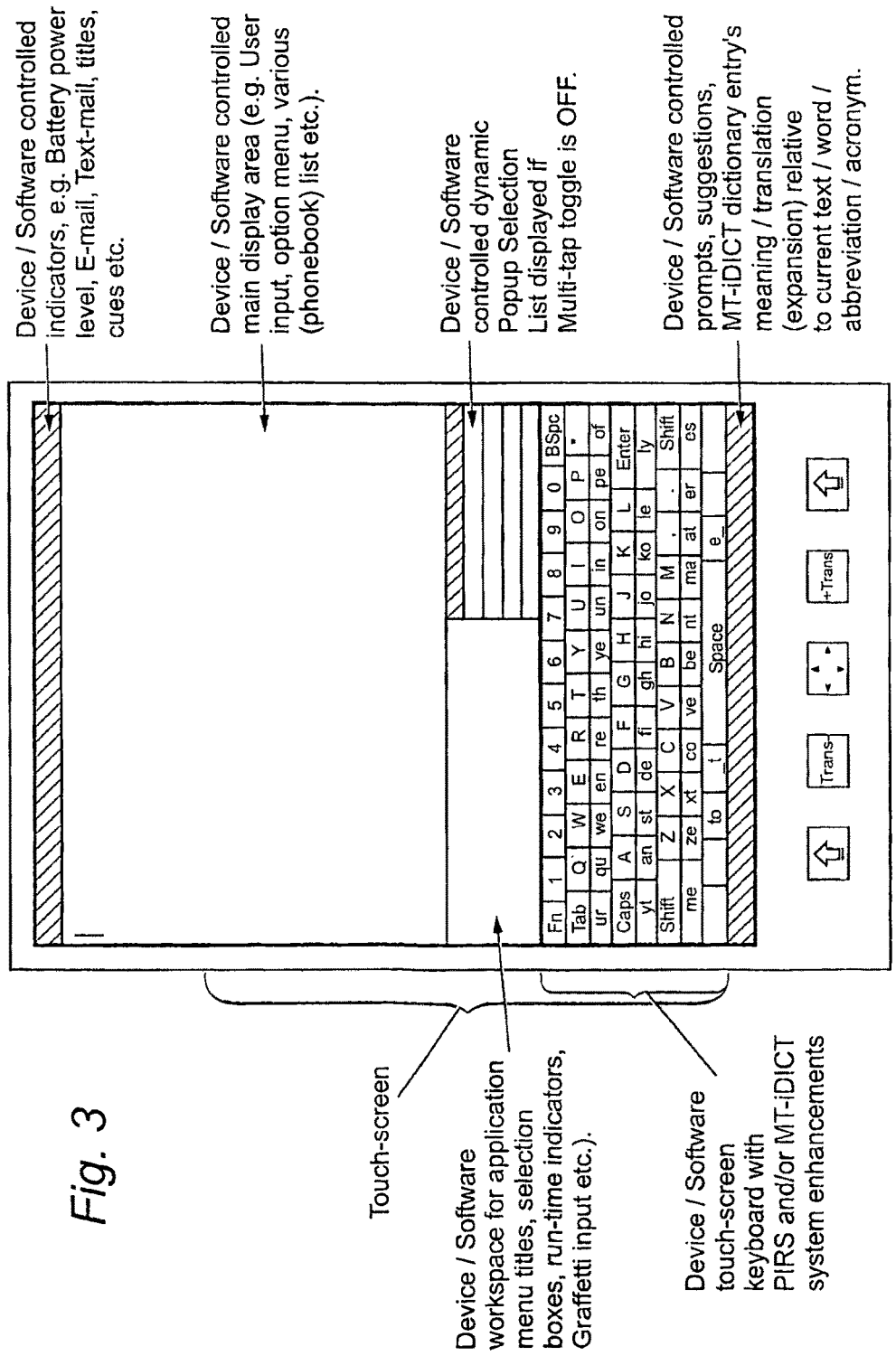

| Fn | 1 | 2 | 3 | 4 | 5 | 6 | 7 | 8 | 9 | 0 | BSpc |
|----|---|---|---|---|---|---|---|---|---|---|------|
| Tab | Q | W | E | R | T | Y | U | I | O | P | " |
| ur | qu | we | en | re | th | ye | un | in | on | pe | of |
| Caps | A | S | D | F | G | H | J | K | L | Enter ||
| yt | an | st | de | fi | gh | hi | jo | ko | le | ly ||
| Shift | Z | X | C | V | B | N | M | , | . | Shift ||
| me | ze | xt | co | ve | be | nt | ma | at | er | es ||
| | | to | _t | Space | | | | e_ | | | |

PIRS and/or MT-iDICT Enhanced Touch-screen Keyboard

*Fig. 4*

| Word: | Key x Presses + Cursor Movement (letter or mnemonic - translation obtained) |
|-------|---|
| Dear | D + 1Select (Dear) |
| Friend | F + 1Select (Friend) |
| Please | P + 1Select (Please) |
| call | C + 1Select (call me) |
| me | |
| as | A + 1Select(asap - as soon as possible) |
| soon | |
| as | |
| possible | |
| to | 2 x 1 (2 - to) |
| fix | FI x 1, X x 1 (fix), SPACE x 1 |
| a | A x 1 (a) |
| date | D + 1Select (date) |
| for | 4 x 1 (for) |
| another | AN x 1, O x 1, TH x 1, ER x 1 (another) |
| meeting | M + 1Select (meeting) |
| PIRS / MT-iDICT: | 2+2+2+2+2+1+3+1+2+1+4+2+4=28   -i.e. summation of key presses for each word |
| Actual Length: | 81   -i.e. actual message length |
| Excess Presses: | 28 - 81 = -53   -i.e. 53 less key presses than actual message length (65.4% PIRS Improvement) |
| PDA/Tablet-PC: | 84   -i.e. number of key presses for conventional PDA Tablet-PC |
| Improvement: | 28 - 84 = -56   -i.e. 56 less key presses than conventional PDA Tablet-PC (66.7% PIRS Improvement) |

*Fig. 5*

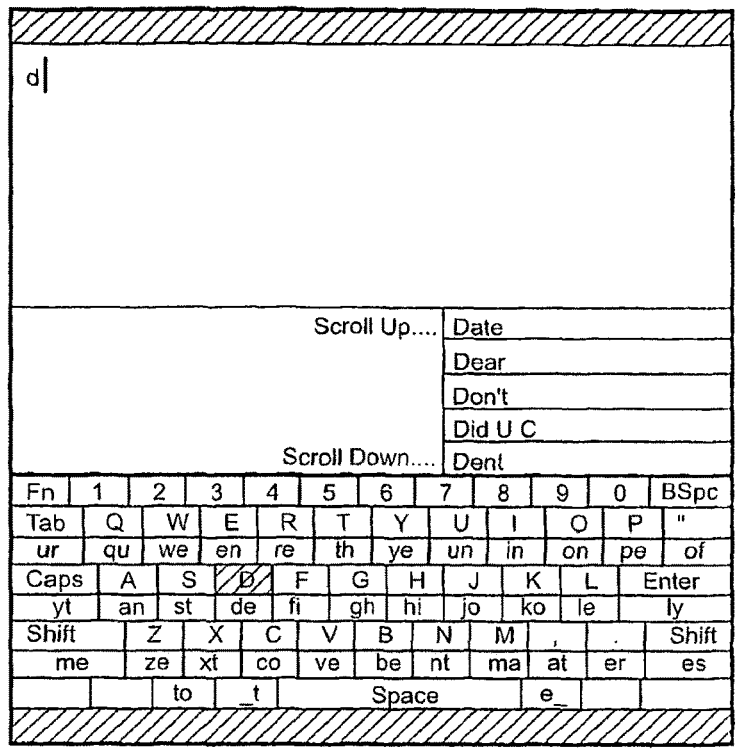
1. Key-D tapped and its PSL is displayed
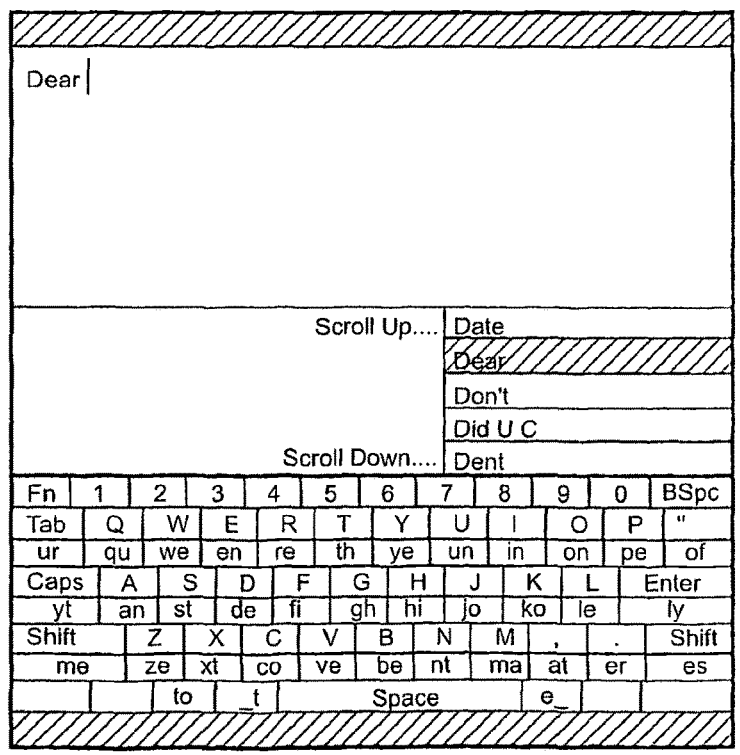
Fig. 6a  2. "Dear" is tapped and replaces typed D

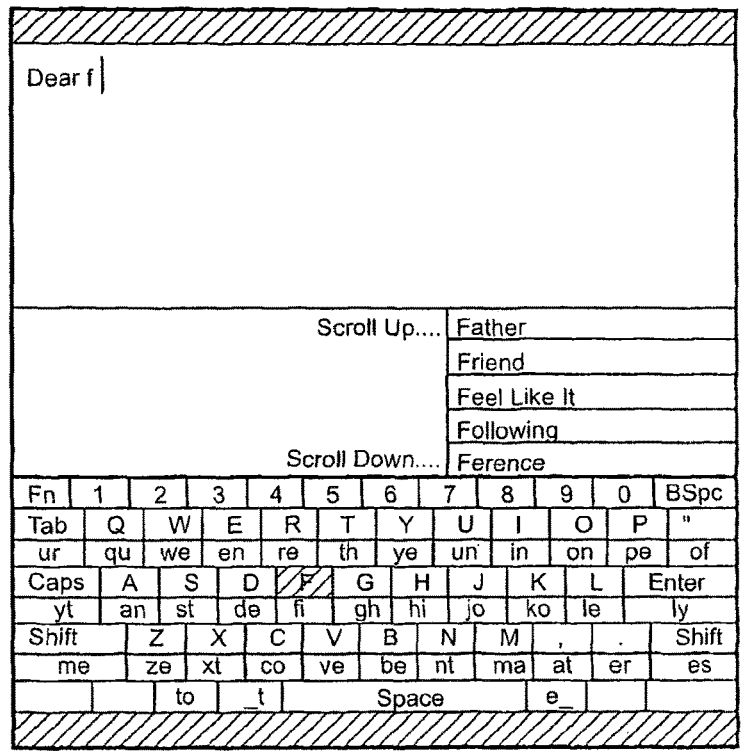
3. Key-F tapped and its PSL is displayed
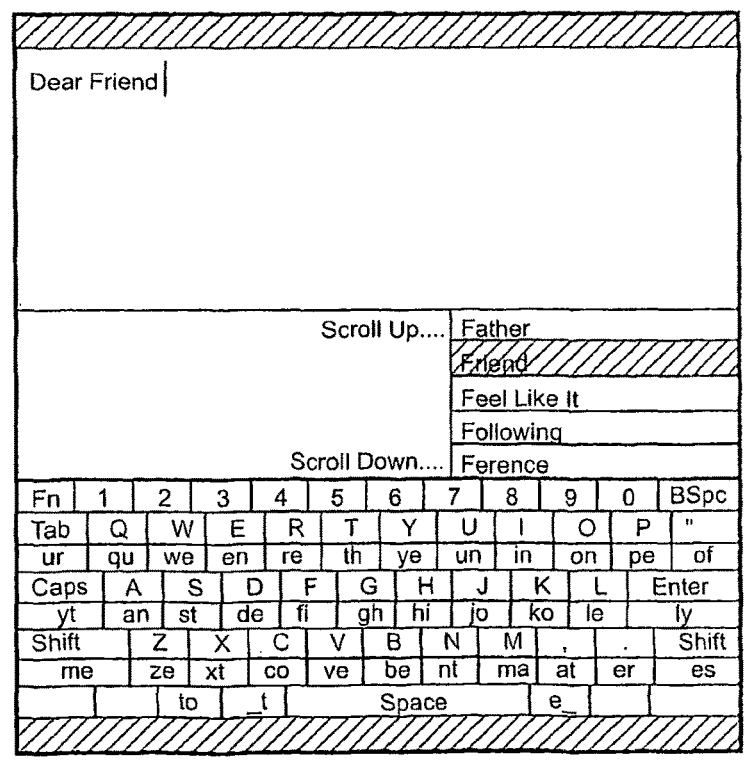
Fig. 6b  2. "Friend" is tapped and replaces typed F

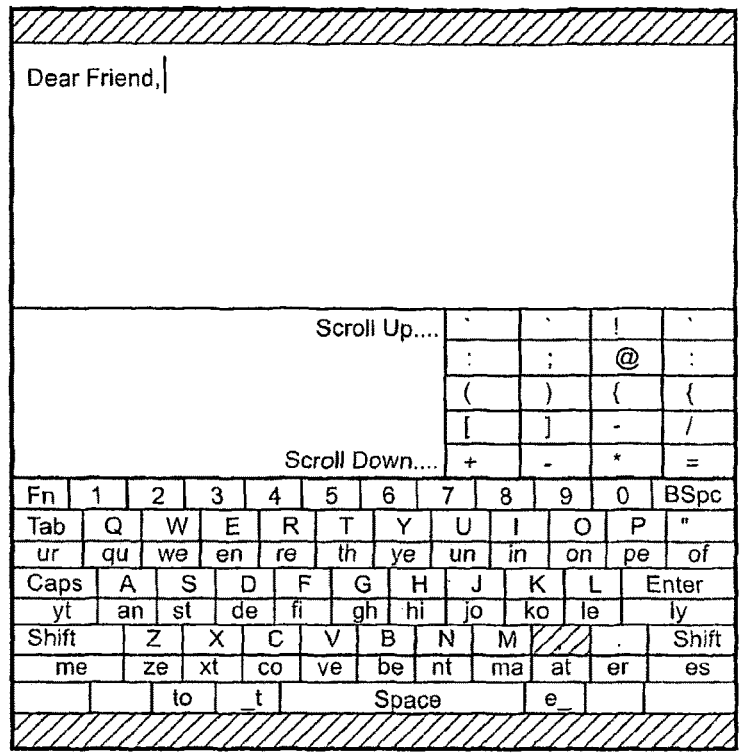
5. Key-, (comma) tapped and its PSL is displayed
Likewise, an alternative symbol PSL is given when
Key-. (dot) is used, and similarly for key-" (quote) etc.
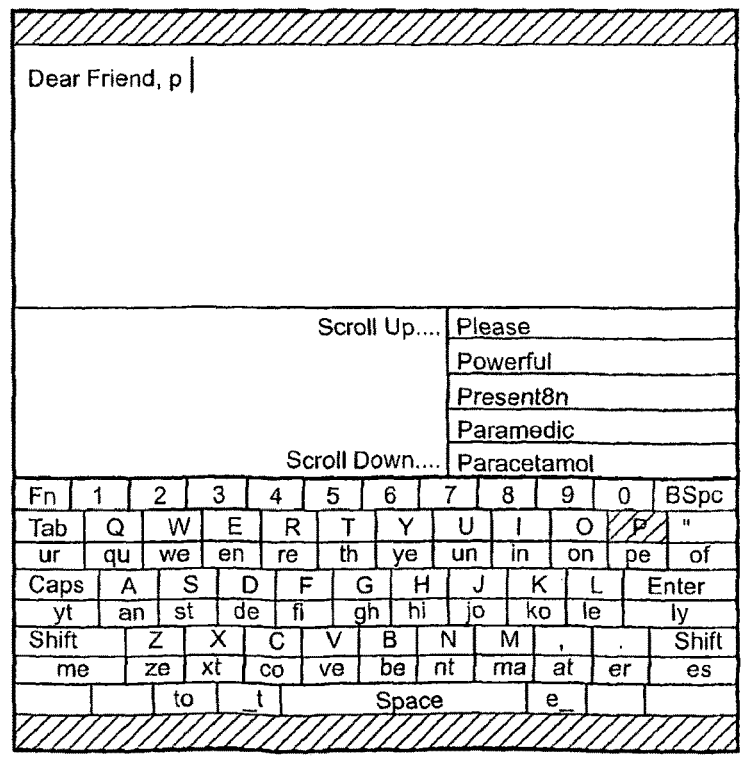
*Fig. 6c*
6. Key-P is tapped and its PSL is displayed

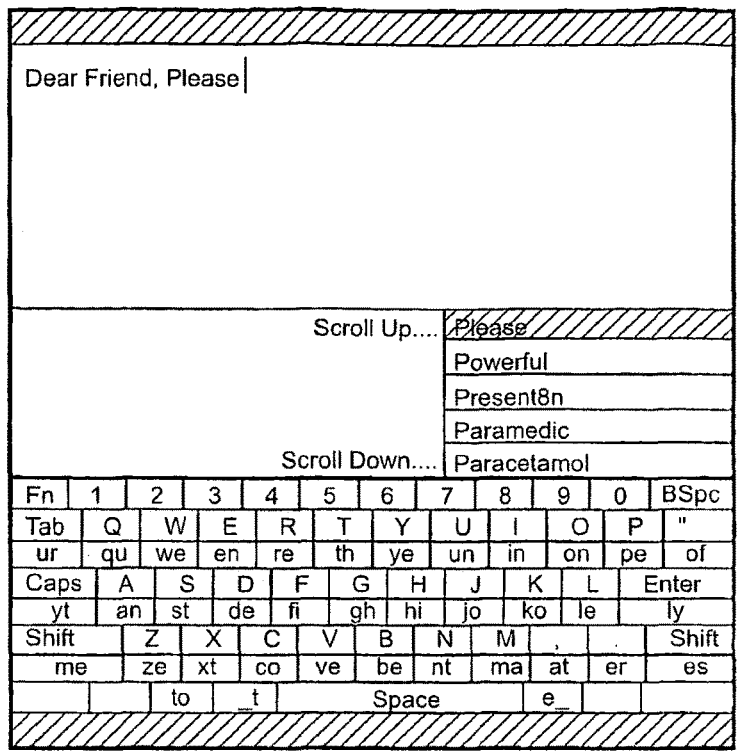
7. "Please" is tapped and replaces typed P
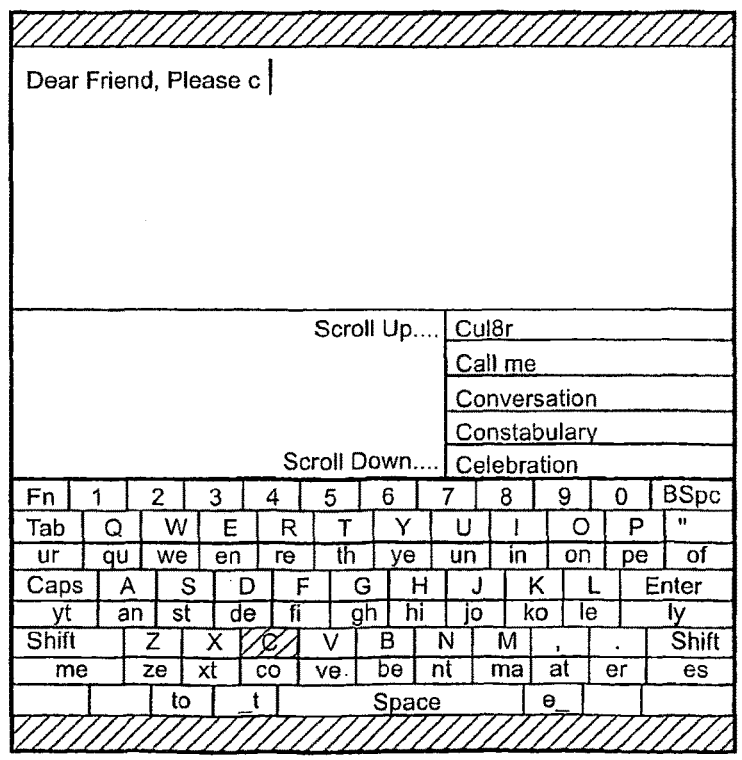
Fig. 6d  8. Key-C is tapped and its PSL is displayed

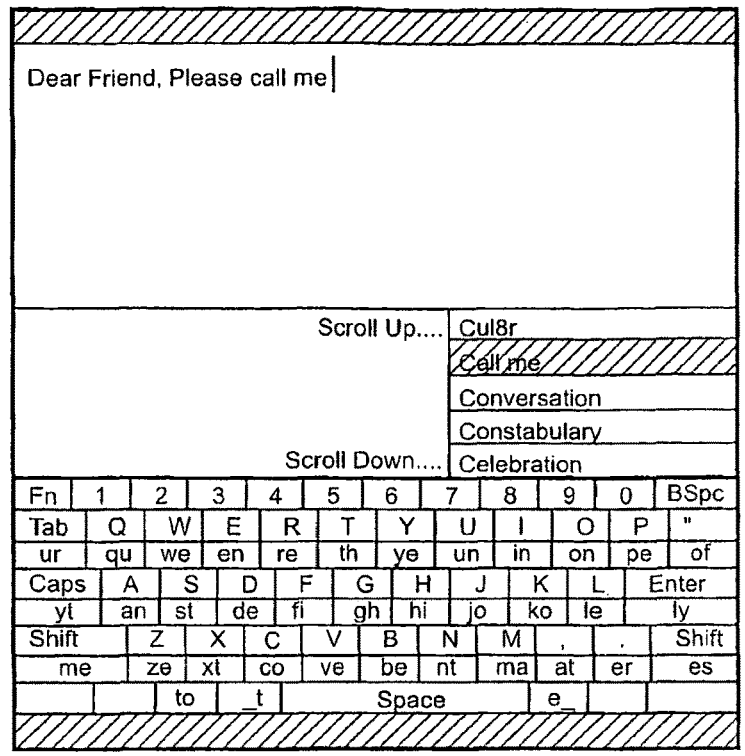
9. "Call me" is tapped and replaces typed C
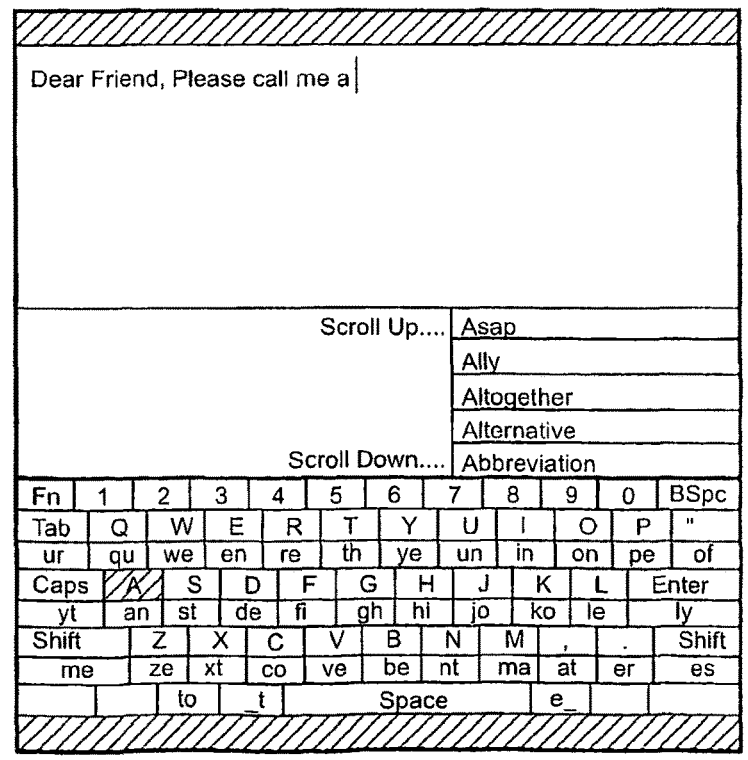
Fig. 6e  10. Key-A is tapped and its PSL is displayed

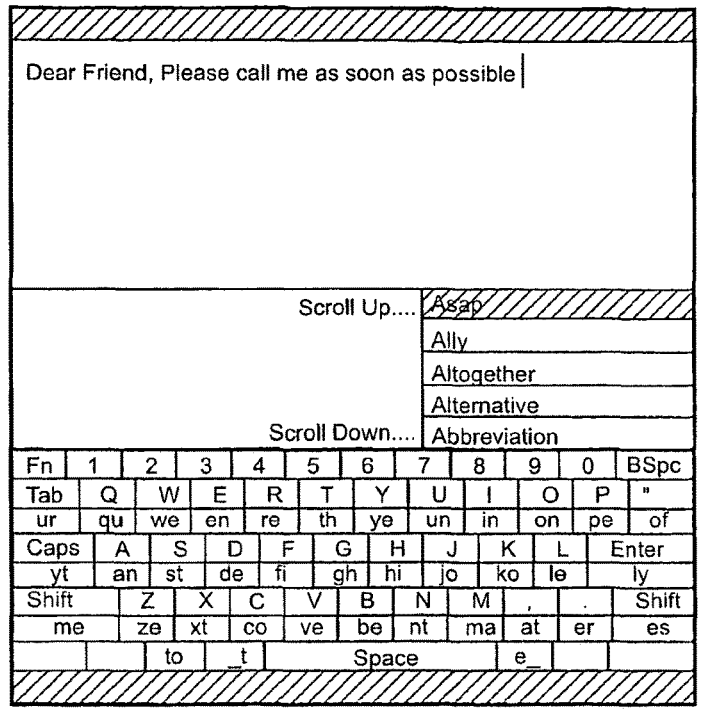
11. 'Asap' is tapped and replaces A with its translation / expansion
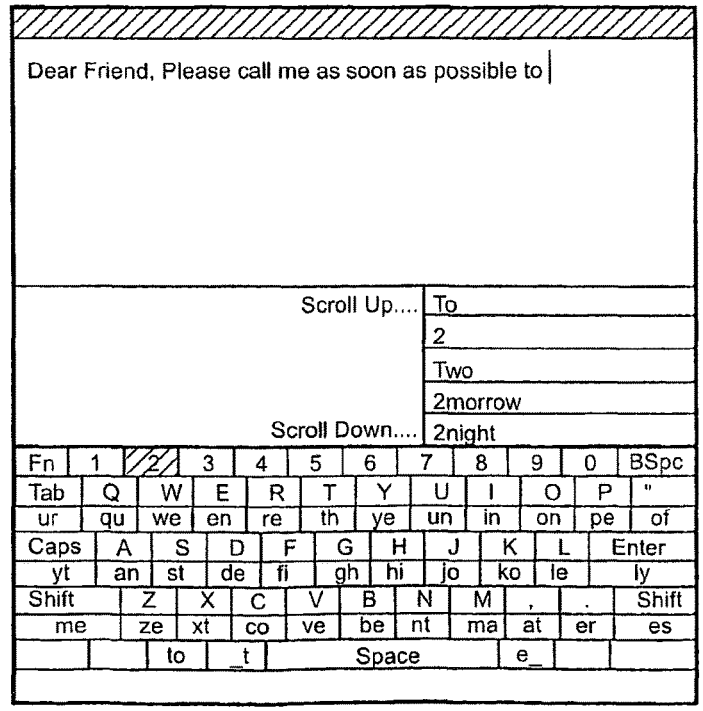
Fig. 6f  12. Key-2 is tapped and its PSL is displayed Number 2 appears in the PSL as option to replace the Auto-translate 'to'.

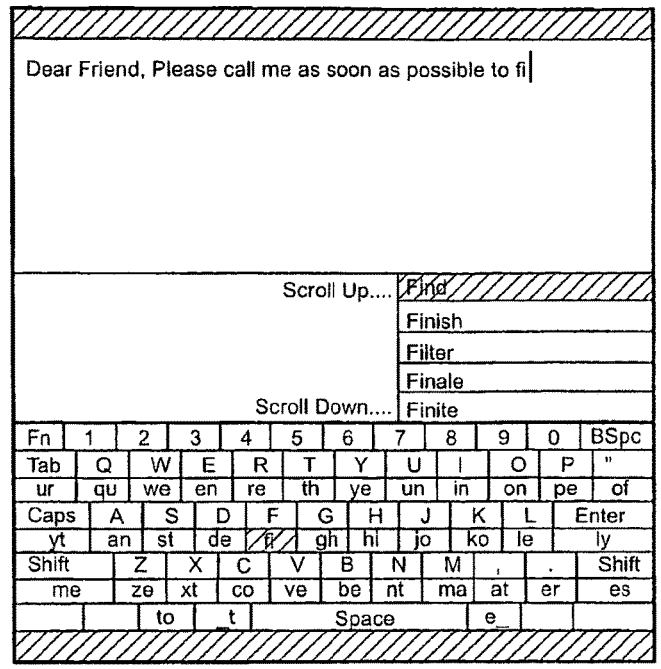
13. Key-fi is tapped and its PSL is displayed Notice that the PSL entries are prefixed by the digraph of the tapped key, i.e. Fi
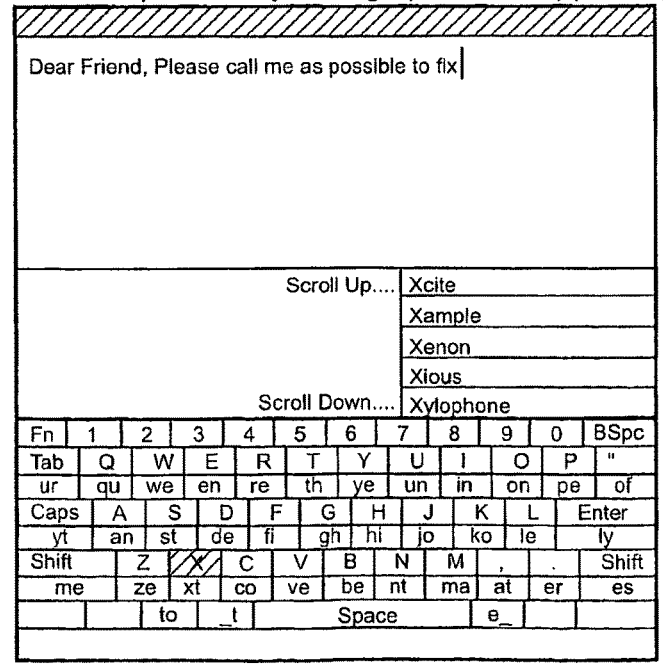
14. Key-X is tapped and its PSL is displayed.
14.1 Key-SPACE is tapped to complete word 'fix'.
Entries not in dictionaries are automatically added
The completed word 'fix' is added to the dictionaries / PSL for Key-F
Fig. 6g

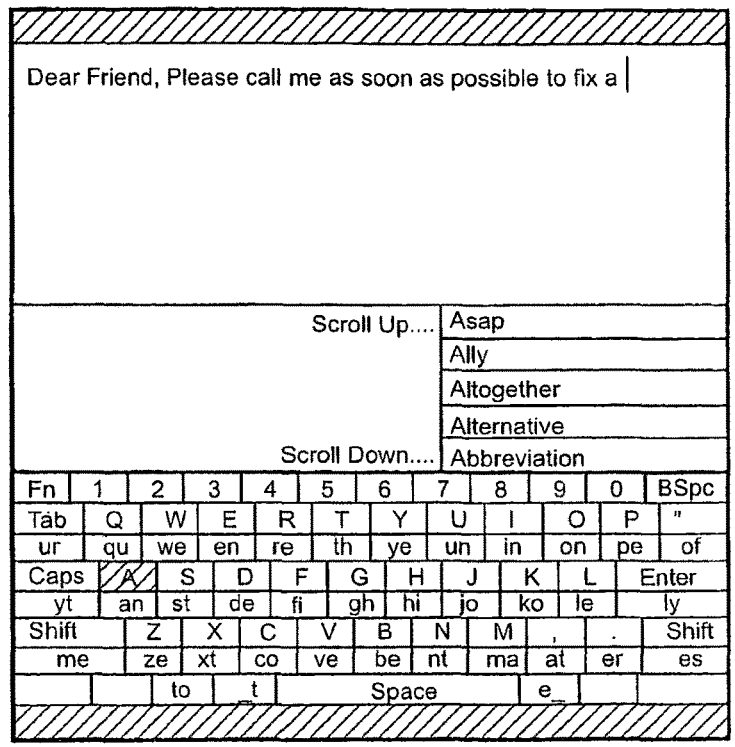
15. Key-A is tapped and its PSL is displayed
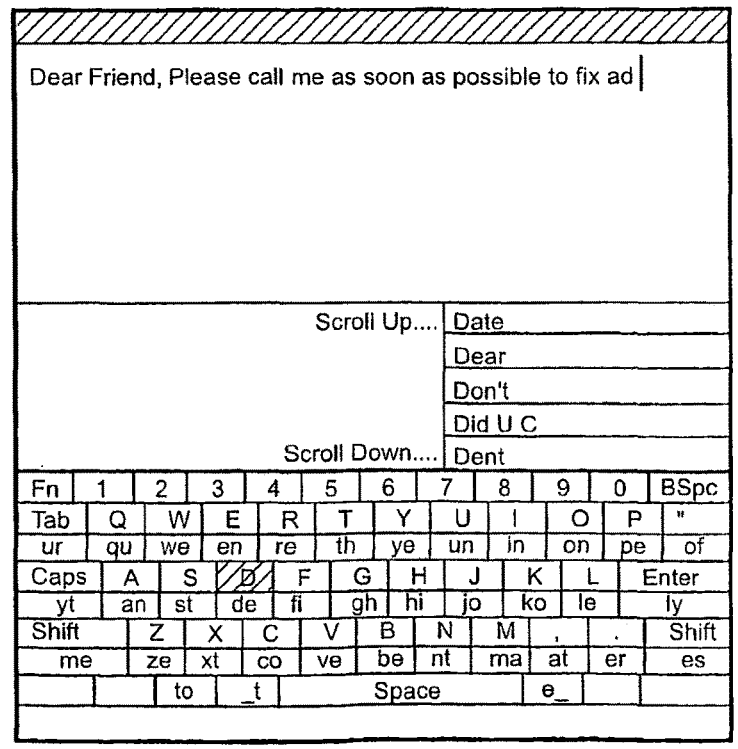
16. Key-D is tapped and its PSL is displayed
*Fig. 6h*

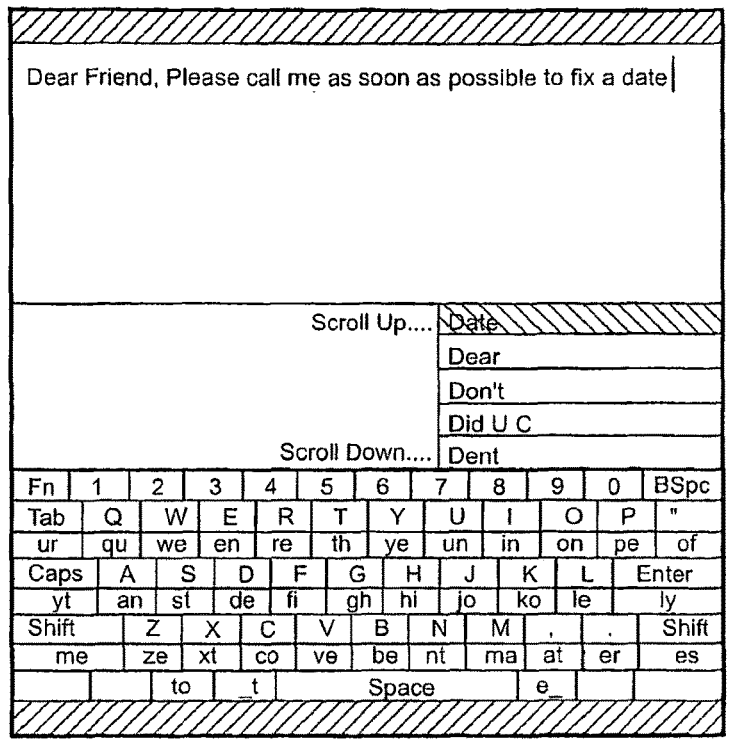
17. 'Date' is tapped and replaces typed D
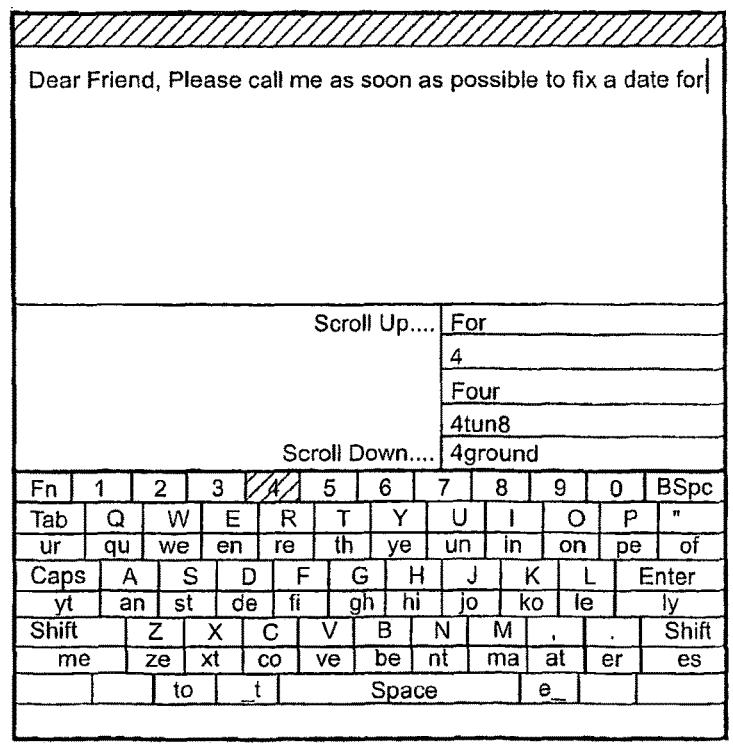
18. Key-4 is tapped and its PSL is displayed
Number 4 appears in the PSL as option to replace the Auto-translated 'for'
Fig. 6i

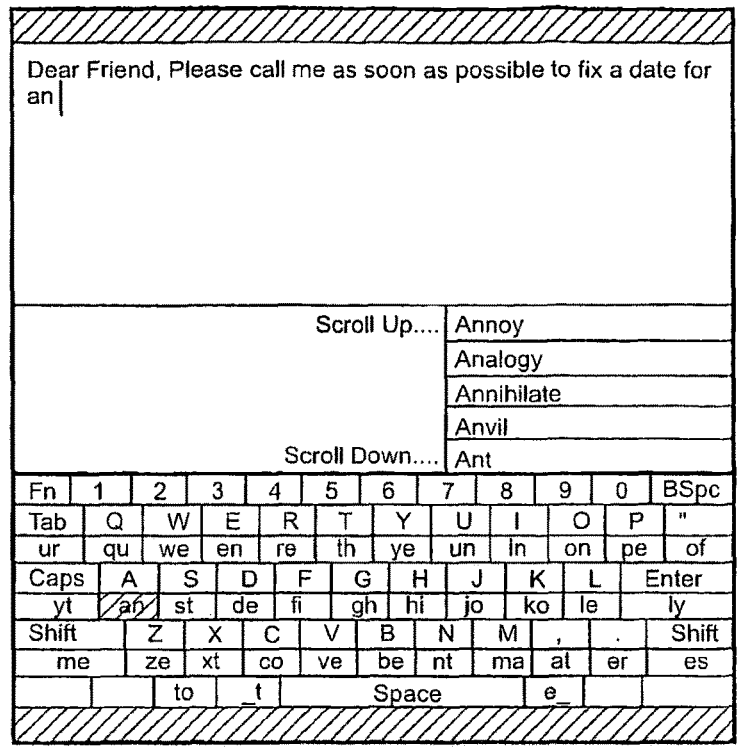
19. Key-an is tapped and its PSL is displayed
Notice that the PSL entries are prefixed by the digraph of the tapped key, i.e. AN
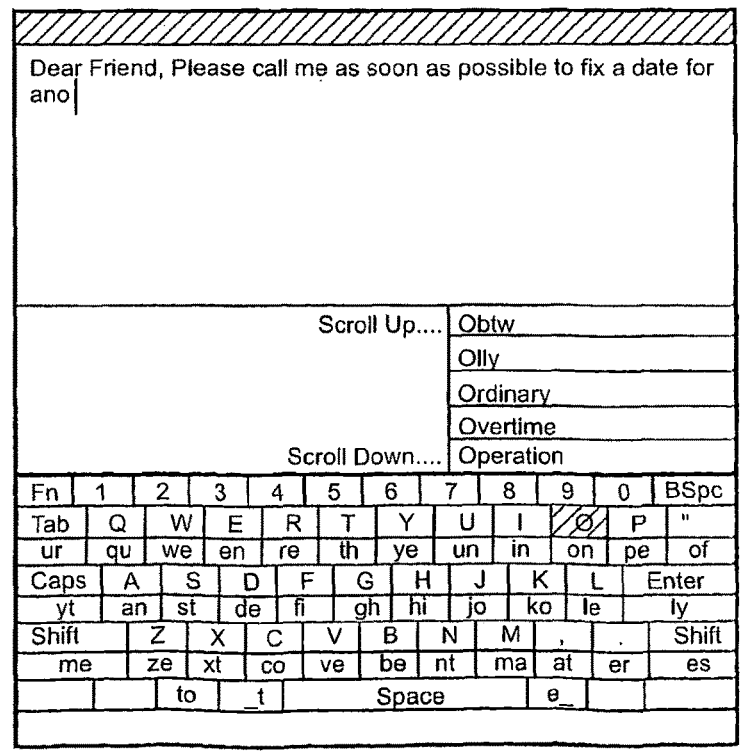
*Fig. 6j*   20. Key-O is tapped and its PSL is displayed

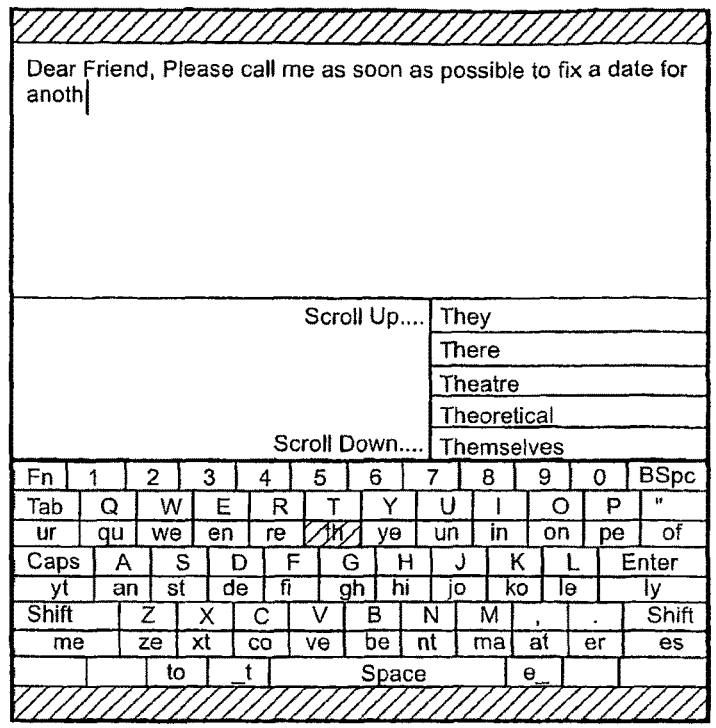
21. Key-th is tapped and its PSL is displayed
Notice that the PSL entries are prefixed by the digraph of the tapped key, i.e. TH
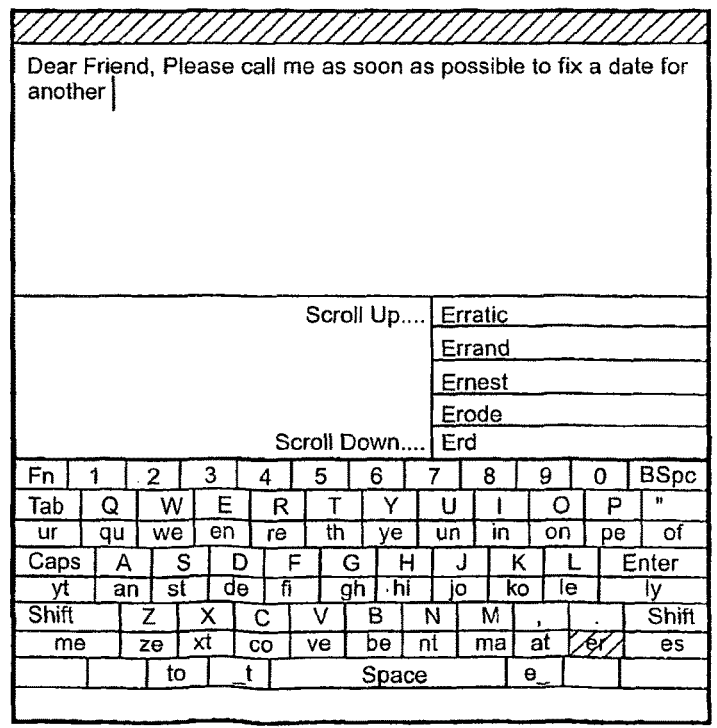
22. Key-er is tapped and its PSL is displayed
Notice that the PSL entries are prefixed by the digraph of the tapped key, i.e. ER
Fig. 6k

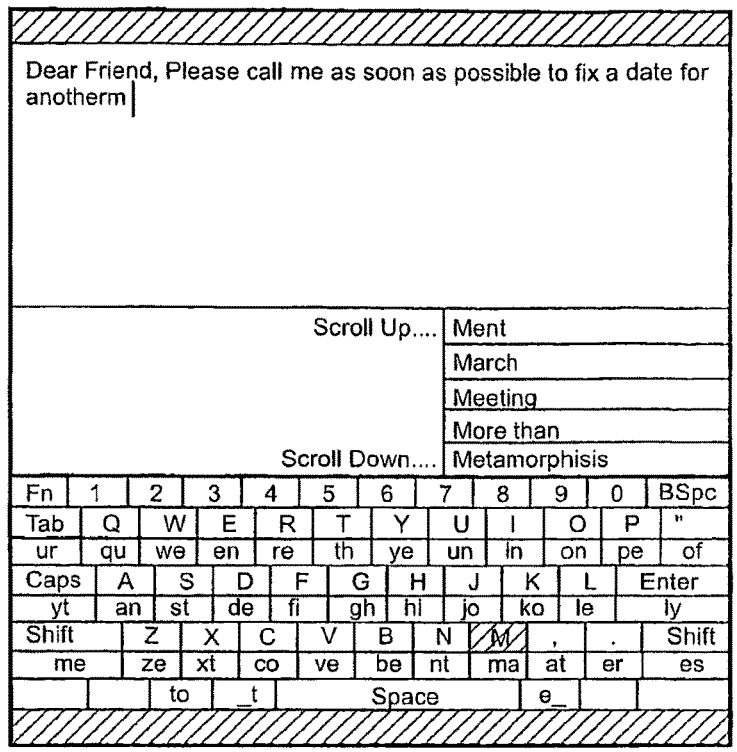
23. Key-M is tapped and its PSL is displayed
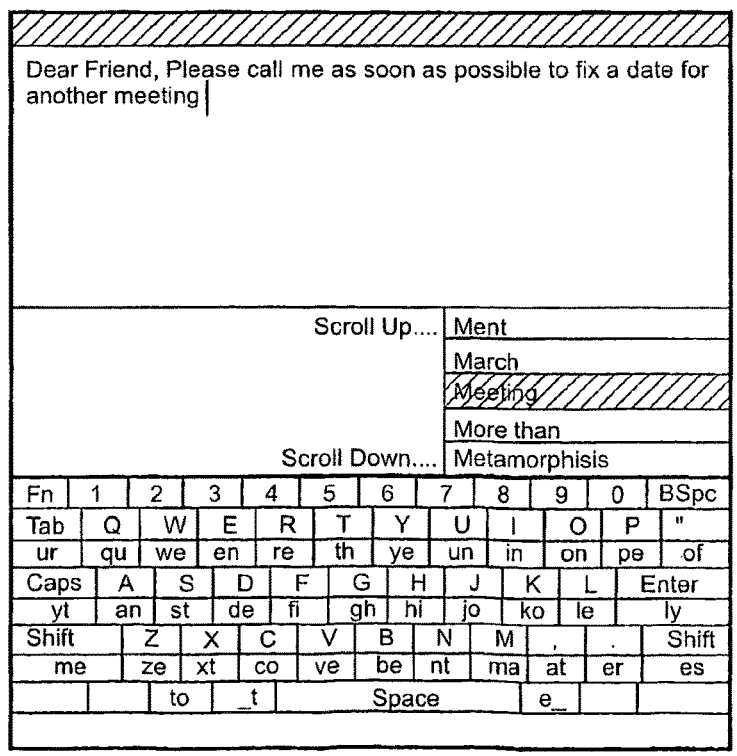
Fig. 6L
24. 'Meeting' is tapped and replaces typed M

Key Taps A,B,C

| Asap |
|---|
| Ally |
| Another |
| Altogether |
| Abbreviation |

| Been |
|---|
| British |
| Ballon |
| Bugs Bunny |
| Banana Split |

| Cul8r |
|---|
| Call me |
| Conversation |
| Constabulary |
| Celebration |

Key Taps D,E,F

| Date |
|---|
| Dear |
| Don't |
| Did U C |
| Deviate |

| Ence |
|---|
| Elly |
| Every1 |
| Effective |
| Effervescent |

| Father |
|---|
| Friend |
| Feel like it |
| Following |
| Furthermore |

Key Taps G,H,I

| Great |
|---|
| Got 2 go |
| Girlfriend |
| Get a life |
| Generation |

| Hello |
|---|
| Heather |
| Have 2 go |
| Hibernate |
| Himalaya |

| Hy |
|---|
| Incorrect |
| Investig8 |
| Imortal |
| Innovation |

Key Taps J,K,L

| Just |
|---|
| Jet ski |
| Jonathon |
| January |
| Justification |

| Kiss |
|---|
| Keep |
| Kelvin |
| Kitchen |
| Kansas City |

| Love |
|---|
| Less then |
| Listen 2 me |
| Legislation |
| Litigation |

Key Taps M,N,O

| Ment |
|---|
| March |
| Maldives |
| More than |
| Metamorphisis |

| Never |
|---|
| Needs |
| Next time |
| Nonsense |
| None the less |

| Obtw |
|---|
| Olly |
| Ordinary |
| Over time |
| Operation |

*Fig. 7a*

Key Taps P,Q,R,S

| Please |
|---|
| Powerful |
| Present8n |
| Paramedic |
| Paracetamol |

| Queue |
|---|
| Quote |
| Question |
| Quantity |
| Quantification |

| Regret |
|---|
| Remember |
| Remind me |
| Remuneration |
| Rejuvenation |

| Sion |
|---|
| Sme1 |
| Soon |
| Society |
| Seventy |

Key Taps T,U,V

| Tion |
|---|
| Tive |
| There |
| Temperature |
| Theoretical |

| Uly |
|---|
| Under |
| Umbrella |
| Universal |
| Unanimous |

| Very |
|---|
| Voice |
| Village |
| Verification |
| Validation |

Key Taps W,X,Y,Z

| What |
|---|
| When |
| Would |
| Waterfall |
| Wonderful |

| Xcite |
|---|
| Xample |
| Xenon |
| Xplicable |
| Xylophone |

| Yday |
|---|
| Yvonne |
| Yourself |
| Yesterday |
| Year 2 go |

| Zero |
|---|
| Zzzz |
| Zentra |
| Zebra |
| Zoology |

*Fig. 7b*

| . | ( | £ | + | 0 |
|---|---|---|---|---|
| . | - |   |   | . |
| Spc | Enter |   |   | . |
| ~ | ! |   |   | . |
| - | :- |   |   | .. |

| . | ( | £ | + | 0 |
|---|---|---|---|---|
| ) | [ |   | ] |   |
| { | } |   | < |   |
| / | \ |   | > |   |
| \| | \\ |   | // |   |

| . | ( | £ | + | 0 |
|---|---|---|---|---|
| & | $ |   | % |   |
| @ | ? |   | ! |   |
| ¬ | # |   | E |   |
| Price | Cost |   | CCY |   |

*Fig. 8*

| . | ( | £ | + | 0 |
|---|---|---|---|---|
| x | = |   | - |   |
| / | . |   | % |   |
| >> | .. |   | ^ |   |
| << | \|\| |   | MKU |   |

| . | ( | £ | + | 0 |
|---|---|---|---|---|
| 0.0 | .000 |   | 00 |   |
| 0.00 | 000, |   | 000 |   |
| 00.0 | 00. |   | .00 |   |
| 0000 | 00, |   | .00 |   |

Symbols PSIs for Example

| Send | Message |
|---|---|
| File | Picture |
| Telephone | Email |
| Animation | Video |
| Sound | Melody |

| Insert | Emoticon |
|---|---|
| File | Picture |
| Telephone | Email |
| Animation | Video |
| Sound | Symbol |

| Text | Size |
|---|---|
| Font | C Align |
| L Align | R Align |
| Auto Align | Bold |
| Underline | Italic |

| Language | English |
|---|---|
| German | French |
| Std ABC | 123 |
| Spanish | Italian |
| Chinese | Japanese |

| In Method | MT-iDICT |
|---|---|
| Multi Lap | T9 |
| Predictor | Accessory |
| Voice | Infra-red |
| Bluetooth | Keyboard |

| Macros | Word |
|---|---|
| Elite | Excel |
| Lotus | Yahoo |
| Z Kong | Invaders |
| Golf | Soccer |

More PSIs for Example

*Fig. 9*

| Next   | generation | of        | adaptive | intelligence | interfaces |
|--------|------------|-----------|----------|--------------|------------|
| Nextel | day        | delivery  | forward  | thinking     | meeting    |
|        | time       | will be   | meet     | proposal     | dinner     |
|        | step       | statistics| for      | 10:10am      | morning    |
|        | level

HUMAN-TO-MOBILE INTERFACES

CROSS REFERENCE TO RELATED APPLICATIONS

The present application is a National Phase Application of International Application No. PCT/GB2006/001097, filed Mar. 23, 2006, which claims priority to Great Britain Application No. 0505941.5, filed Mar. 23, 2005, which applications are incorporated herein fully by this reference.

The present invention relates to human-to-mobile interfaces and particularly, but not exclusively, to a user interface and an interface system, both for facilitating a reduction in the number of physical keying or tapping events gestures required to create a data string (i.e. mnemonics, abbreviations, words, sentences etc.).

Conventional devices employing Graphical User Interfaces (GUI's) such as Personal Digital Assistants (PDA), PDA's with telephone functionality, Smart phones, or tablet-PC's include basic input media (i.e. physical buttons, keyboards, keypads, touch pads, touch screens and/or on-screen graphical keyboards), navigation means and other screen components. Unless otherwise mentioned, the term PDA represents all the aforesaid types of devices. The integration of various other add-on accessories into the device, or the connection of external accessories is also possible.

On conventional PDA's or Tablet-PC's, whenever input is required by the currently active software, an alpha-character representation of a QWERTY keyboard is displayed on the device's display screen (with or without the numeric and/or punctuation symbol keys). Each key is accessed by means of a tap using a pointing device (for example, a pen, stylus or finger). Usually each key is represented by an area (e.g. square) and its primary key-value or legend is displayed within the area. The keys combine to form a matrix of keys in the form of a keyboard or key-screen.

The display screen may also show various screen options accessible by means of the pointing device and selected or activated via a tap. Screen indicators or cues are selectable by the user depending upon what is expected by the software/device. FIG. 1a shows an example of a very basic graphical key-screen for a GUI device such as a PDA or Tablet-PC.

The numeric keypad part of a conventional keyboard can be summoned by means of a screen option, with or without a matrix of symbols that are, or are not, usually available on a conventional keyboard (i.e. all punctuation symbols, symgraphs etc.). FIG. 1b shows an example layout of a basic graphical numerical/symbolic-screen for a GUI device such as a PDA or Tablet-PC.

The GUI device may also have an electronic writing pad or touchpad that can decipher handwriting (for example Palm Graffiti) or provide alternative touch based options.

To type the following message "Dear Friend, Please call me as soon as possible to fix a date for another meeting" requires one tap per letter keying as depicted in FIG. 2. Upper casing of letters (Key Shift=3), general punctuation (Key, =1) and spacing between words (Key Space=15) accounts for an additional +19 key taps. Human-to-Mobile Interfaces (HMI) need to change in order to fulfil the capacity at which the technology permits optimal use of itself. In particular, there is a need for a human-to-mobile interface which reduces actual physical interactivity (i.e. data input or key tapping) while still using existing conventional input methods and hardware. In this way, a cost effective means to evolve interface methods progressively into the next generation of more advanced and more efficient HMI systems will be achieved.

According to one aspect of the present invention there is provided a method of character recognition for a personal computing device comprising a user interface capable of receiving inputs that are to be recognised through data input means which are receptive to keyed, tapped or a stylus input, said device being adapted to facilitate a reduction in the number of physical keying actions, tapping actions or gestures required to create a data string to less than the number of characters within said data string:

storing a set of data strings each with a priority indicator associated therewith, wherein the indicator is a measure of a plurality of derivatives associated with the data string;

recognising an event;

looking up the most likely subsequent data string to follow the event from the set of data strings based on one or more of the plurality of derivatives;

ordering the data strings for display based on the priority indicator of that data string;

if the required subsequent data string is included in the list selecting the required subsequent data string;

if the required subsequent data string is not included in the list entering a event and repeating steps b to e;

updating the priority indicator of the selected data string;

updating the set of data strings based on the updated priority indicator.

According to another aspect of the present invention there is provided a personal computing device interface system capable of receiving inputs that are to be recognised through data input means which are receptive to keyed, tapped or a stylus type input, said device being adapted to facilitate a reduction in the number of physical keying actions, tapping actions or gestures required to create a data string to less than the number of characters within said data string:

a memory for storing a set of data strings each with a priority indicator associated therewith, wherein the indicator is a measure of a plurality of derivatives associated with the data string;

an event recognition module for recognising an event; means for looking up the most likely subsequent data string to follow the event from the set of data strings based on one or more of the plurality of derivatives; display means for displaying a list the most likely subsequent data string in an order based on the priority indicator of that data string;

means for selecting the required subsequent data string if it is included in the list;

data entry means for entering an event;

means for updating the priority indicator of any selected data string and the set of data strings based on the updated priority indicator.

The present invention describes a system that attempts to reduce the number of physical interactions required to create a data string, based on etymological and ontological derivatives extracted from dynamic qualitative and quantitative information corresponding to sub-data strings stored in data dictionaries.

The described system operates through selection of data strings as input rather than the repetitive interactions required by existing systems for text entry or guiding prediction.

Physical interactions include but are not limited to key presses, taps or handwriting gestures.

Derivatives include but are not limited to timestamp, cognitive coherence, perceptual indices, associative indices, grammar orients, correlative weights, inference ratios and pattern factorisation, etc. that represent the adaptive intelligence of the system.

Qualitative and quantitative information stored includes but is not limited to (i) statistical information relating to a data string's historical usage or selection (i.e. frequency of use/selection, character length, lexical pattern density/versatility, chronological weight and direction/operational indicators etc.); (ii) probability information relating to a data string's historical usage (i.e. occurrence and/or association ratios of two or more sub-data strings within a longer data string; context ratios determining the likelihood of a given data string being grouped with one or more other sub-data strings to determine the context of a longer data string; (iii) run-time analytics (scaling patterns of use, historical usages, contextualization, associations and occurrences thereof); (iv) dictionary priority; (v) dictionary chains (where each chain also retains and uses the information in (i), (ii) and (iii) above); (vi) data string maps between other data strings (where each map also retains and uses the information in (i), (ii) and (iii) above); and (vii) translations.

The qualitative and quantitative information could be populated before the system is used and/or populated and manipulated by the user. The system could extract the required qualitative and quantitative information from documents or other data collections relevant to the user. Thus the system can acclimatize to user language traits at any stage.

The qualitative and quantitative information stored in the dictionaries is updated whenever the system is used.

The qualitative and quantitative information could be synchronized between two or more interface systems by means of wired or wireless connectivity. Qualitative and Quantitative information could also be synchronized between two or more interface systems by downloading from and uploading to a common database.

The system can handle multiple data dictionaries at the same time.

The current invention presents an interface system capable of displaying a representation of a plurality of data input keys having multi-character indicia which are receptive to keyed or tapped input. The multi-character indicia are dynamically selected to accord with a statistical extrapolation of the most used alphanumerical character combinations in a given language or for a particular user.

The present invention saves time required for entering a data string.

The present invention empowers usability of mobile devices and thereby, unleashes their capabilities.

The current invention describes a system that provides other physical interactivity reduction features (in addition to providing data strings for selection). These include but are not limited to (i) automatically entering a space after a selected data string; (ii) automatically performing forward or backward translations between mnemonics or abbreviations or acronyms and their corresponding full data strings; (iii) automatically providing alternate suggestions such as synonyms, antonyms, corrections for spelling errors, etc. (iv) providing options to launch applications that are mapped to certain macros, etc.

The current invention describes a system that provides means to the user for configuring all the qualitative and quantitative parameters involved in generating and displaying all the data strings meant for subsequent selection by the user.

The current invention describes a system that can also function as a remote-input mechanism for other personal computing devices.

The current invention describes a system that validates all the other specified claims in a language-independent manner.

The current invention describes a system provides mechanisms or Application Programming Interfaces (API) that allows other software systems to utilise and benefit from all the features of this invention, and to enable improved experiences for the user with such software systems. Additional to this, the API allows other software systems data storage or information repositories to be handled by this invention in similar manner to its own dictionaries etc.

The current system derivatives can be applied to any set of patterns, including but not limited to other world languages.

Differentiation of current system against existing frequency based predictive systems can be made by distinguishing (i) number of factors used in determining suggestions, (ii) factors in current system themselves represent varied properties at any one time including but not limited to discrete values, (iii) factors in current system can be at any one time rules, discrete or continuous statistics, indicators or directive placements, (iv) the current system provides suggestions by evaluating candidates using a dynamic weighing scheme that determined by the inter-relationships of the weighing factors at any one time, (v) current system is a selective input system with absolute keying for refining the projection of suggestions.

Existing prediction systems do not consider the nature of language composition. They solely rely on the frequency of particular words in making predictions and are oblivious to the need of the composition. The current invention attempts to capture the essence of language composition in a dynamic and natural way. The spirit of language composition lies in realizing the importance of context, grammar and semantics. The contributions of context, grammar and semantics are captured by the etymological and ontological derivatives used by the current invention. These derivatives are applied in parallel or sequentially. The derivatives are all inter-related and therefore, can affect their own weight or the weight of other derivatives during execution, resulting in a dynamic weighing scheme. The current invention provides suggestions by evaluating candidates using the dynamic weighing scheme. For example, in a scenario involving three derivatives (say grammar orients, associative indices and contextual ratios), the grammar orients enforces the type (part-of-speech) of suggestion in light of the composition and overall syntax. There are many possibilities for the part-of-speech and this can directed by the other two derivatives. At the same time, the grammar orients influences the weights of associative indices and/or contextual ratios. Clearly, the mechanics for evaluation in any composition scenario are variable and completely dynamic. The execution of the derivatives could yield multiple permutations whereby some permutations may collapse while others may contribute further in the determination of the validity of the composition instance. From this, the non-collapsed permutations will be prioritized over the collapsed ones, thereby yielding valid weighing schemes at this stage. From the remaining permutations, the prioritization could be measured by the continuity, size and length of the candidates. This stage is another tier regarding the various weighing schemes involved.

The dictionaries used by the current invention provide the qualitative and/or quantitative information to build the multi-dimension vector (MDV or matrix) that is created for each composition but could also contain the entire dictionary par se. The associative indices could be weighed (size) according the to distance between of any one or more data strings within this MDV, and the context ratios determine similarly alternative branches relative to other data strings within the current composition instance. These could be permutations for the associative indices influenced by the context ratios. The grammar orients likewise influence which permutations are prioritized according to syntax build of current composition as well as directive of immediate or next N part-of-speech expectations and/or variances thereof. The matrix evolves in real-time dynamically) accordingly building collapsible and non-collapsible permutations, which also begin to influence or direct paths (greatest effect or lineage), weighing schemes, the involved derivatives themselves as well as possibly others that could be activated, and eventual suggestions pertained in the permutation and evolved lineage within the MDV.

Embodiments of the present invention will now be described, by way of example only, with reference to the following figures, in which:

FIGS. 1a and 1b illustrate examples of conventional graphically represented touch-screen keyboards showing alphabetic and numeric/symbolic characters respectively;

FIG. 2 is a table showing keying/tapping or gesturing statistics for the creation of an example data string on a conventional device;

FIG. 3 shows a plan view of a personal computing device according to the present invention having a graphically represented keyboard adapted to facilitate a reduction in the number of keying or tapping events or handwriting gestures required to create a data string;

FIG. 4 shows an example of a graphically represented touch-screen keyboard having keys with multi-character indicia;

FIG. 5 shows a table illustrating comparative statistics (i.e. conventional device vs. personal computing device of the present invention) relating to the number of keying/tapping events or handwriting gestures required to create the data string exemplified in FIG. 2;

FIG. 6 shows twenty-four example screen shots relating to each keying/tapping event or handwriting gestures necessary to create the data string exemplified in FIG. 5;

FIG. 7 shows twenty-six example Pop-Up Selection Lists, each corresponding to a letter of the alphabet and each generated using the personal computing device interface system according to the present invention;

FIG. 8 shows four example Pop-Up Selection Lists, relating to symbols generated using the personal computing device interface system according to the present invention;

FIG. 9 shows six example Pop-Up Selection Lists relating to software facilities, each generated using the personal computing device interface system according to the present invention;

FIG. 10 shows an example table of associatively mapped and prioritised data strings.

Figure 11:
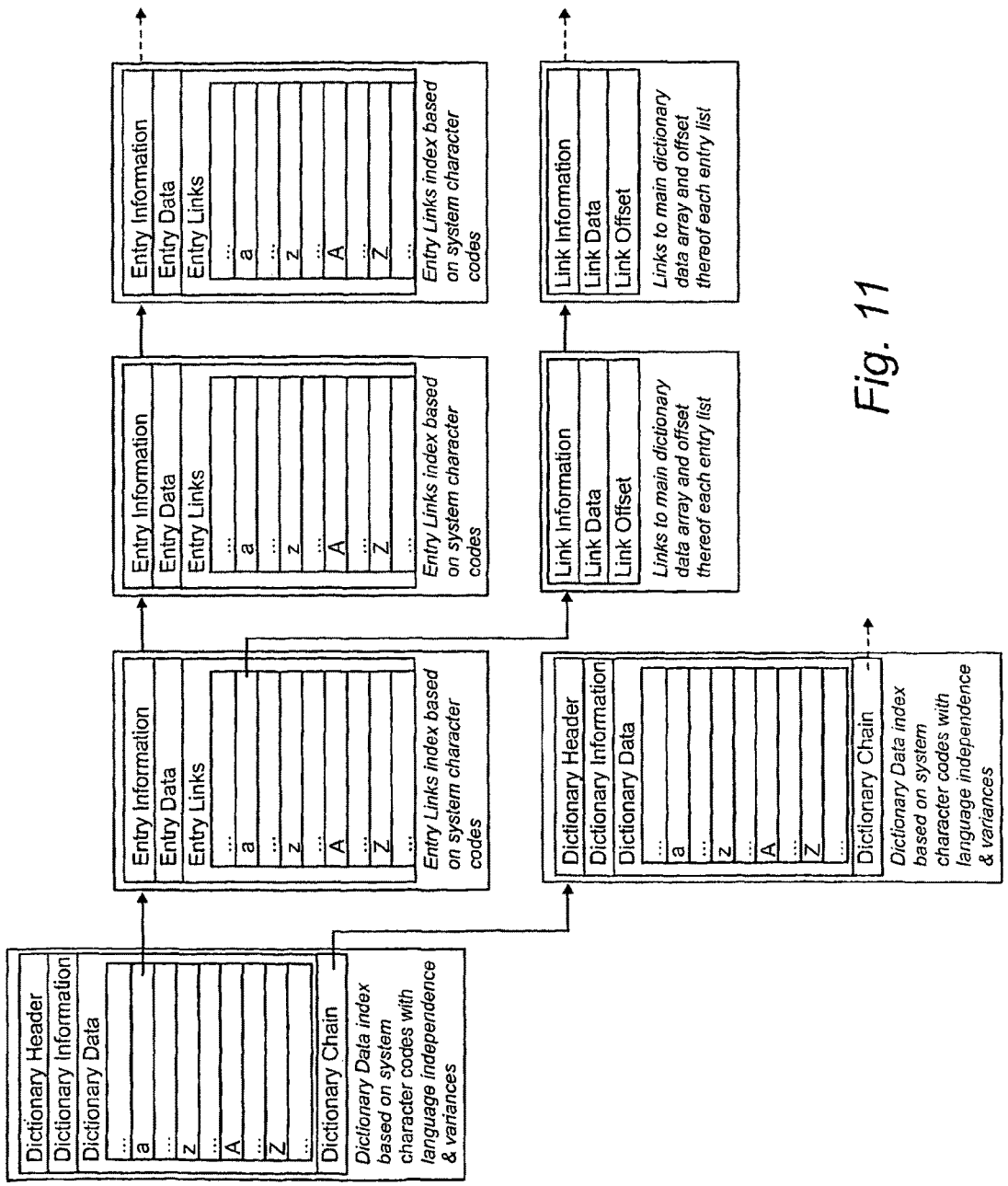
FIG. 11 illustrates the chaining of data dictionaries and associative mapping.

A basic keyboard/keypad of a personal computing device, whether physical or graphically represented, can include further keys that permit a direct reduction in a user's physical interactivity with the device using the fundamentals of etymology and ontology. These additional keys provide a means to input diverse patterns based on language or graphics and represent particular lexical fragments or basic components of such languages or graphic systems. Foldable accessory keyboards can be extended to have integrated keys dedicated to statistically extrapolated digraphs, tri-graphs, tetra-graphs etc. of any given language to make creation of words more efficient and less user-interactive.

Core lexical components or data string fragments combine to create larger data strings. The phrase "data string" and "character string" are interchangeable throughout the specification unless the context requires otherwise. Similarly, depending upon the context, the term "sub-data string" or "truncated data string" may refer to letters or lexical fragments within a word, or a word within a phrase or sentence, mnemonics, abbreviations, acronyms etc.

For any given language, its core lexical components (letters, numbers and symbols) and its most occurring character string fragments can be used to create larger complete character strings that become contextual by representing meaningful words, phrases, sentences, paragraphs and fuller texts. Such patterns can include the most frequently occurring digraphs (two-letter combinations forming a single lexical unit, e.g. TH, ER, EN, AN etc.), tri-graphs (three-letter combinations forming a single lexical unit, e.g. ENT, LLY, TCH, ATE etc.), tetra-graphs (four or more letter combinations forming a single lexical unit, e.g. TIVE, ALLY, MENT, ENCE etc.) and sym-graphs (emoticons, e.g.:-) for smiley etc.). The same principles apply to graphic systems by using common and simpler abstract patterns to generate larger, more complex graphic patterns. Those fundamental components occurring with the most frequency in any given language are most useful as key legends or indicia.

The lower the length or size of these core lexical components, the greater their simplicity and the more amplified their cognitive coherence. Cognitive coherence measures a character string's diversity, versatility and breadth of contextualisation in terms of reusability and/or its ability to build larger character strings easily and repeatedly. Letters, numbers and symbols have the highest cognitive coherence since they represent the basic lexical/numerical components and building blocks for any given language. Words, phrases, sentences and fuller texts have lower cognitive coherences the higher one goes up this chain. Digraphs have a particularly high cognitive coherence since they are practically at the bottom of the chain, having a similar cognitive coherence to that of letters. Digraphs can be loosely coupled with other letters and patterns to create larger more meaningful character strings, semantics and contexts.

The use of digraphs, tri-graphs and tetra-graphs provide easy acclimatisation toward their use because of their high cognitive coherences; i.e. they are easily recognisable and easy to place within larger patterns during the construction of meaningful words, phrases, sentences and fuller texts within any context or semantics. Digraphs, tri-graphs and tetra-graphs also reduce the amount of physical interactivity by facilitating a reduction in the number of keying or tapping events or handwriting gestures required to create a character string. This may be achieved by eliminating key-presses or taps or gestures by means of providing data input keys (either physical or graphically represented) having multi-character indicia which correspond with a statistical extrapolation of the most used alphanumerical character combinations (i.e. letters, numbers and symbols) in a given language by the user.

The personal computing device shown in FIG. 3 has a graphically represented touch-sensitive keyboard. The keyboard differs from conventional keyboards in that some of the keys are provided with secondary multi-character indicia which accord with a statistical extrapolation of the most used alphanumerical character combinations in a given language by the user.

If the data strings are to be entered using handwriting type gestures the device will have appropriate e screen and stylus type provisions.

Advantages of the personal computing device of the present invention include ease of use, reduced user-interactivity, elevated efficiency and thus enhanced productivity that in turn yields improved accuracy and flexibility. Reduced interactivity is a stress/strain antidote that reduces the risk and occurrence of Repetitive Strain Injuries (RSI). Furthermore, reduced interactivity has the further benefit of lessening wear and tear of the personal computing device itself.

Comfort is a palliative benefit. The only effective way to improve ergonomics and prevent injury is to do less of any activity, e.g. reduce keying or tapping on keyboards and keypads.

The personal computing device of the present invention improves the overall user experience and interactivity with Mobile Technology (MT) devices. The apparatus can be used independently of the interface system that forms a second aspect of the present invention (described in detail below), or for maximum benefit, both the personal computing device having multi-character indicia and the interface system may be used in combination.

As suggested above, a software-based approach can be used (either in isolation or in combination with the multi-character indicia aspect of the invention described above) to reduce a user's physical interactivity with a personal computing device. This is achieved by means of a personal computing device interface system (which will be known under the Trade Marks MT-iDICT™ and/or AdapTex™) that provides and maintains an Adaptive Intelligence™ data dictionary system. This personal computing device interface system controls and uses various interactivity dynamics, statistics and meta data pertaining to each data string (including but not limited to mnemonics, abbreviations or acronyms) stored within one or more data dictionaries installed within a storage means of the AdapTex™ personal computing device interface system. None, one or more than one dictionary can be installed at any given time. Dictionary installation and configuration thereof can be done in real-time.

Each data dictionary holds qualitative and/or quantitative information relating to a given data string. Examples of qualitative and/or quantitative information are as follows: (i) statistical information relating to a data string's historical usage or selection (i.e. frequency of use/selection, character length, lexical pattern density/versatility, chronological weight and direction/operational indicators etc.); (ii) probability information relating to a data string's historical usage (i.e. occurrence and/or association ratios of two or more sub-data strings within a longer data string; context ratios determining the likelihood of a given data string being grouped with one or more other sub-data strings to determine the context of a longer data string; or other statistical derivatives based on language and user traits such as timestamp, cognitive coherence, perceptual indices, associative indices, grammar orients, correlative weights, inference ratios and pattern factorisation etc.); (iii) run-time analytics (scaling patterns of use, historical usages, contextualization, associations and occurrences thereof); (iv) dictionary priority; (v) dictionary chains (where each chain also retains and uses the information in (i), (ii) and (iii) above); (vi) data string maps between other data strings (where each map also retains and uses the information in (i), (ii) and (iii) above); and (vii) translations.

Derivatives are behavioural language properties that can be rules, states, continuous or discrete values, indicators, or placements at any one time, whereby each derivative condition can be dynamically manipulated according to other respective derivatives. Therefore, there could be multiple ways to realise these derivatives within the interface system. Different apparatus or method or algorithm can be constructed to exploit these derivatives to provide apposite projections, for example one being simple continuous or discrete statistics based systems only. The value of using these proprietary derivatives is that they permit dynamic determination of contextual, grammatical and semantical language compositions as naturally as possible.

"timestamp"—the date and time the dictionary entry, chain or map was created, last used or accessed. Preferably adjacent to type of application the invention is being used in conjunction with.

"cognitive coherence"—measures the versatility & flexibility of patterns (i.e., ease of re-usability and placement of language based patterns).

"perceptual indices"—measures the strength of recognizing patterns (i.e., ability to deciphering language based patterns—even when patterns are incorrect/misspelled).

"associative indices"—measures the relevance of two or more patterns (e.g., the combination of words or the appropriateness between words).

"grammar orients"—the lexical syntax or placement of patterns according to their semantics (i.e., rules for contextual and semantic positioning of nouns, verbs, adverbs, adjectives etc.).

"correlative weights"—measures the semantic relevance between two or more patterns (i.e., where different words mean the same or elaborate other words—much like thesaurus weights).

"inference ratios"—measures the likelihood of a semantic relevance between two or more patterns (i.e. occurrence of one word within other words meaning/description).

"pattern factorisation"—measures the ability to create/breakdown larger patterns from/to smaller patterns (i.e., textual or graphic—contextually letters, numbers & symbols have highest factorization, then digraphs, tri-graphs, tetra-graphs, words, phrases, sentences, paragraphs, chapters, and finally whole texts in this order of factorization).

All of the qualitative and quantitative information is dynamically updated in real-time and in accordance of use for all entries or data strings, maps and chains, translations maintained within the dictionaries (described in further detail below), and further statistical attributes & software control dynamics. The data dictionaries can be manually populated and/or manipulated. Alternatively, the data dictionaries can be automatically populated by use of document or text scanners, which scan data strings and assemble their statistics, probabilities, run-time analytics as well as associative maps between data strings. The idea being, that such documents or texts written by a user reflect the behavioural use of vocabulary and patterns of the language(s) reflected by the user.

A data string may be in the form of a full data string (i.e. a word, phrase, sentence etc.) or a corresponding truncated data string such as a mnemonic, abbreviation or acronym. The prioritisation of data retrieved from a data dictionary is user-configurable to allow a user to prioritise the ordering of data listed on a display means according to selected qualitative and/or quantitative characteristics. The user configurable parameters include system behavioural parameters, data string statistics, probabilities and analytics (scaling patterns of use: historical usages, contextualization, associations, relative associations and occurrences thereof), and dictionary priorities.

In addition to those mentioned above, further qualitative and/or quantitative characteristics may include: (i) the presence or absence of one or more data string fragments in the form of digraphs and/or tri-graphs and/or tetra-graphs etc. within a full or truncated data string; (ii) the presence or absence of truncated data strings in the form of mnemonics, abbreviations or acronyms which correspond with the full data string; (iii) two-way translations between full data strings and their corresponding truncated data strings; (iv) the frequency of two-way verbatim, correlated and/or inferred translations between two languages (i.e. English to French); (v) the character-length of each full data string or its translation or any corresponding truncated data string; (vi) the frequency of selection by a user of each full data string (i.e. words, numbers, symbols, emoticons etc.) or its translation or any corresponding truncated data string; (vii) the frequency of forward and backward translations between full and truncated data strings; and (viii) the frequency of forward and backward verbatim, correlated and/or inferred translations between two languages. Each data dictionary may also hold indicator flags that dictate and delimit control and use of the stored data by the software, and the level that it pertains to relative software tiers.

Data strings stored within the data dictionaries are selected/accessed using the first character of the data string, and could be ordered by descending frequency and ascending length for basic default sequencing. The ordering could be configurable by the user using any field (qualitative or quantitative) of the data dictionary. Ordering can also be configured to be ascending or descending. The first character is sourced from a single keying or tapping event or handwriting gesture or a composite group of first characters obtained from keying or tapping events or handwriting gestures.

A configuration tool permits setting the various behavioural aspects (also known as physical interactivity reduction characteristics) of the AdapTex™ personal computing device interface system. The behavioural aspects (physical interactivity reduction characteristics) are as follows but not limited to: (i) automatically entering a space after a selected full or truncated data string; (ii) limitation of displayed mnemonics to those having a total number of characters greater than the number of keying or tapping events or handwriting gestures required to display said mnemonic on the data display means; and (iii) automatically performing forward or backward translations between mnemonics or abbreviations or acronyms and their corresponding full data strings.

Further behavioural aspects include specifying the number of selected entries to be displayed or listed on the display means at any one time, maximising a mnemonic to become the most frequent of its category with highest priority, editing of entries, or ordering run-time selections based on certain qualitative or quantitative characteristics in ascending or descending order etc.

Further behavioural aspects include specifying a projection of N words or sentences by way of using the associative maps and other qualitative/quantitative statistical derivatives.

The interface system can also determine a user's most frequently used phrases (i.e. full data strings) and automatically abbreviate or implode them into a mnemonic, acronym or other abbreviation (i.e. a truncated data string). This allows a user to have fewer key presses via the truncated data string which can then be manually or auto-translated into its corresponding full data string. See the Trans+ and Trans− screen options or buttons on the personal computing device of FIG. 3 which can be used to perform manual imploding or exploding of data strings. The personal computing device can also be configured to perform this function automatically.

Due to screen size, a limited number of most used entries pertaining to a keying or tapping event or handwriting gesture can be displayed at any one time. All additional following entries that could not be displayed can be scrolled through using the navigation means up to a maximum set by the configuration tool.

The diversity of dictionary types is enormous, e.g. one thousand most used words, mnemonics, acronyms, abbreviations, conversions, Short Message Service (SMS) texting data, emoticons or other data specific to the user and/or a user's working environment etc. Data dictionaries can be even more specialised by being departmentalised within specific working environments. For example, in a medical environment the dictionaries can reflect symptoms and remedies, ailments and pharmaceuticals, or simply provide normal medical terms and their definitions. In a reservation environment, the dictionaries can reflect airlines, destinations, flight codes, seating, hotels, prices etc. In an investment trading environment the dictionaries can reflect trading instruments, traders, portfolios, Reuters Instrument Codes (RIC), trader specific RICs, quantities, buy/sell prices and forecast analytics etc.

Dictionaries can also be integrated into any other software and controlled dynamically to reflect changing circumstances to the entries within respective dictionaries. This provides real-time Adaptive Intelligence relative to the user, working environment and type of system being used adjacent to its purpose.

The real-time maintenance of dictionaries and the dynamics of the AdapTex™ personal computing device interface system allow it to contour towards a user's traits and uses of the device, along with the user's use of language and level of vocabulary. This enables the AdapTex™ personal computing device interface system to be adaptive and intelligent relative to the user's volume, level and type of use of the system. Over time, the data dictionaries will evolve to reflect the most favourable and most appropriate or relevant data strings used by the user and thus adapt and contour the AdapTex™ personal computing device interface system relative to, and more appropriately towards, the user.

As with the multi-character indicia aspect of the present invention, the benefits of the personal computing device interface system include ease of use, reduced user-interactivity, elevated efficiency and thus enhanced productivity that in turn yields improved accuracy and flexibility. Reduced interactivity is a stress/strain antidote that reduces the risk and occurrence of Repetitive Strain Injuries (RSI). Furthermore, reduced interactivity has the further benefit of lessening wear and tear of the personal computing device itself. The combination of both the multi-character indicia aspect of the invention together with the software elements of the interface system provides the greatest benefits in terms of facilitating a reduction in the number of physical keying or tapping events or handwriting gestures required to create a data string.

Synchronisation of users' data dictionaries between personal computing devices maintains accurate translations, semantics and meanings. Synchronisation can occur or be accomplished using infrared, Bluetooth® or other wireless connectivity methods available on personal computing devices, or can be achieved by a simple telephone call between the devices where such functionality is available. Alternatively, central repositories or databases can be maintained by the communications service providers that the devices can access easily, or they can be maintained and accessed/downloaded via internet. These synchronisation mechanisms maintain consistency of dictionaries and their use thereof by groups of users. The central repositories (i.e. internet databases) provide a means to standardise dictionaries for the general population of users.

Once the personal computing device interface system software and AdapTex™ data dictionary facilities are integrated/installed into the device, the software aspects can use and process AdapTex™ data dictionaries using standard systemic logic to achieve optimum utilisation, i.e. using best processing methods and techniques to obtain all the efficiency benefits. The configuration tool also permits the scanning of existing messages resident on the personal computing device or the downloading/transfer into the device (i.e. by either Internet, PC or other compatible device using cable or wireless technologies) of dictionary data in order to acclimatise the AdapTex™ data dictionaries relative to the data strings used within the messages.

The personal computing device interface system software uses the AdapTex™ dictionaries according to the keying or tapping or gesturing sequences entered by the user either in passive mode or in active real-time dynamic mode. Various navigation features can be used in parallel or adjacent to the interface system software in order to rapidly access the most frequently used (i.e. keyed or tapped or gestured) information. The interface system software reduces the physical aspects of repetitive and recursive keying or tapping or gesturing thereby enhancing efficiency and ease of use and improving the overall effectivity and experience in using the personal computing device.

The personal computing device of the present invention includes various physical interactivity reduction features (PIRS) which facilitate a reduction in the keying or tapping events or handwriting gestures required to produce a data string. For example, the represented QWERTY on-screen keyboard can be modified to use the most frequently used language digraphs (as shown below the conventional key legends in FIGS. 3 and 4). It will also be appreciated that DVORAK (dual-handed, left-handed and right-handed), MALTRON® or other user configurable keyboard layouts can be represented.

Screen options or existing physical buttons can be used to perform translations (see the 'Trans+' and 'Trans−' in FIG. 3). Double tapping (also known as multi-tapping) of a given key on the represented keyboard accesses the most used word or phrase beginning with the tapped letter or generates a prioritised list of the most frequently used words corresponding to the tapped letter. This allows the user to conveniently select the desired word or phrase from the list. Alternatively, double tapping can be configured to simply upper case the tapped letter.

The personal computing device can be custom configured for each user and their frequent habits. FIG. 4 shows an example of a graphically represented keyboard comprising a plurality of data input keys utilising digraphs. The graphically represented keyboard could of course employ other forms of multi-character indicia such as tri-graphs, tetra-graphs or a user's most frequently used words or phrases for each specific letter as an alternative to the most frequently used digraphs.

The digraphs represented on the keyboard can be dynamically generated and displayed according to the frequency of their individual occurrences within the installed dictionary. Accordingly, the digraphs available for selection are contoured towards a particular user by being measured against the most frequent occurrence, or most frequent use, of digraphs beginning with a given letter in a particular language (e.g. English, French, German, Spanish, Italian, Chinese Mandarin/Cantonese, Japanese etc.). The digraph with the higher-frequency of occurrence or use within the installed dictionaries will be displayed as a secondary key legend (i.e. below the primary conventional QWERTY key legends in the example shown in FIG. 4).

The digraphs shown in FIG. 4 can be dynamically updated and/or re-ordered in real time to reflect statistical changes relating to the use of each key in constructing data strings in the language of the user.

For example, when another digraph having the same initial letter becomes more frequently used than the current most used digraph, then it will be displayed in the place of the prior digraph (e.g. if the digraph 'je' becomes more frequently used than 'jo' then 'je' will be selected and displayed under Key J). As mentioned above, a configuration tool of the personal computing device tool permits scanning of existing messages resident on the device or remotely mapped to the device in order to acclimatise the AdapTex™ dictionaries relative to the mnemonics used within the messages and this may change the graphically represented digraphs accordingly.

The AdapTex™ personal computing device automatically activates whenever the device enters into a state that requires any form of input, e.g. numerical or text. Multi-tapping or pressing a key does one of the following: (i) summons a Popup Selection List (PSL) of data strings; or (ii) toggles through a list of data strings that is filtered according to the current cursor location and relative to which individual key is multi-tapped, or in response to composite key taps. The configuration tool of the personal computing device allows a user to choose either the Multi-tap PSL or Multi-tap toggle method.

The first data string or system option in a PSL is highlighted for selection by the user by default. The highlighted data string or system option is selected/activated using the pointing device or physical keys/buttons. Highlighted data strings or system options are also automatically selected if any other key is tapped, or via a navigation movement.

Alternatively, the first letter of each data string is underlined whereby keying or tapping or gesturing the respective key selects the data string or system option without the need to scroll to it first. Where there is more than one data string or system option with the same initial character, these are scrolled through in the order presented in the Pop-Up Selection List.

When the PSL is displayed, the desired data string (for example, a mnemonic) can simply be selected by directly tapping with the pointing device.

Alternatively, if the desired data string does not appear in the list, the next letter of the data string is tapped to further filter the PSL.

To create the following data string: "Dear Friend, Please call me as soon as possible to fix a date for another meeting" using the AdapTex™ personal computing device interface system requires the key tapping events illustrated in the example screen-shots of FIG. 6.

The following options are assumed to be set to ON (i.e. activated) via the personal computing device's configuration tool: (i) automatic forward translation from a sub-data string (e.g. a mnemonic) to full data string (e.g. a word, phrase, sentence, description, translation etc.); (ii) Multi-tap PSL to generate a 'most used' data string list; (iii) displaying of data strings longer than the number of taps required to generate the list; and (iv) auto-spacing after selection of a data string. Auto-project mode (described further below) is set to OFF. Upper casing of letters (Key Caps=3), general punctuation (Key, x1=1) and spacing between words (Auto-Spacing ON=0) account for +4 additional key presses in the above example.

The 'Trans+'and 'Trans-' buttons can be configured such that when pressed simultaneously with a key tap, the most used and least used data string for that key is retrieved respectively.

If the 'Auto-project' mode was set to ON in the example above, then a projection of n words of the entire phrase would be projected upon tapping 'd' and automatically or manually selecting 'Dear'.

The AdapTex™ personal computing device interface system is not a Predictive Typing Systems (PTS). PTS integration with AdapTex™ interface system would allow the PTS to predict more accurately since it is adapting to the users vocabulary in real-time and can presume to hit the users most used data strings (i.e. words, mnemonics, sentences etc.) at every instance.

The AdapTex™ interface system formulates logic and prioritisations derived from the data storage qualitative or quantitative information, methods, frequencies and patterns of behaviour and usages of words/mnemonics of the user. Thus it becomes adaptive to the user and the user's vocabulary and traits. This provides the most favourable and most appropriate and relevant choices for the user based on the user's actual vocabulary, historic usages, frequencies, patterns of use, methods and prioritisations, each being derived from the qualitative or quantitative information stored in the data storage means. The AdapTex™ interface system provides data string choices based on actual usages rather than on guesswork as to what the user is trying to create relative to a static generic dictionary.

Predicting typing systems do not reduce the amount of interactivity as effectively as AdapTex™ interface system purely because the former still requires further key-presses to guide its prediction, whereas the latter simply provides discrete choices of full or partial data strings (i.e. shortcuts, whole words, phrases, or partial data strings that can be used to build up or complete fuller data strings, e.g. digraphs, tri-graphs, tetra-graphs and symbol-graphs).

When the personal computing device is in text input mode, PSL's are displayed upon detection of an activating key or tap or gesture and/or appropriate navigations by the user. The PSL's show the most frequently used or most appropriate or relevant data strings for each letter or digit associated with the tapped key or gesture. A series of example Pop-Up Selection Lists relating to each letter of the English alphabet generated using the personal computing device interface system according to the present invention are shown in FIG. 7.

The PSL's shown in FIG. 7 are purely for example only, and in reality would dynamically present entries within the installed dictionaries and be prioritised relative to each user's patterns of use. User typed data strings are entered into the AdapTex™ N dictionary when no such entry exists. This mechanism allows the device to adapt to a user's usage and a user's environment that dictates the type and level of use. The new entries are immediately accessible by the AdapTex™ interface system. Thus, the AdapTex™ adapts dynamically in real-time making interaction for the user more familiar and making relative information more apparent to use and/or access.

Symbols can be accessed by means of the PSL facility also. The symbols are categorised and ordered according to frequency of use, i.e. the more a particular symbol is used, the higher and closer it is to the 'home' highlight when the Symbols PSL is instigated and the easier it becomes to access. The example shown in FIG. 8 shows various Symbols PSL categories. Keys * and # also provide emoticons as well as normal functions.

Software facilities, inserts or application macros can be accessed using the PSL facility also. Again, like Symbols PSL's, the 'More' PSL options are categorised and ordered according to frequency of use, i.e. the more the options are used the higher and closer they are to the 'home' highlight when 'More' PSL is instigated and the easier they become to access. The example shown in FIG. 9 shows the various PSL's for the 'More' option along with example categories.

The AdapTex™ interface system for personal computing devices such as PDA's and Tablet-PC's can also be utilised by mobile telephones that have or provide a similar touch-screen interface.

An extension to the translation mode is the automatic generation of acronyms, abbreviations and conversions. Here the user interface and interface system can dynamically determine acronyms, abbreviations and conversions for such mapped associations, thereby providing automated translator shortcuts for the most recurring or commonly used phrases, sentences or texts of n character strings, which can be stored and maintained within any dictionary and made readily available. The user is made aware of such automated acronyms, abbreviations and conversions via the keyboard driver dictionary console, display/reporting and edit features where the user can also create personalized shortcuts and where these shortcuts can also include system or device commands and executable instructions/macros.

The personal computing device interface system is also provided with a 'mapping mode'. Dependent on this mode being activated and various chains between dictionaries being predefined and established by the user during installation or via run-time configuration tools, or automatic chaining is activated, the interface system will perform chained translations of keyed or tapped or highlighted text. This involves the interface system scanning and mapping appropriate translations from one dictionary to another. Here the interface system maintains lookup chains between any dictionaries such that dynamic mapping can be made from one dictionary to another, and so on. For example, English-to-French (dog, chien) and French-to-German (chien, hund) dictionaries can be chained such that it can infer English-to-German (dog, hund) mapping.

More sophisticated dynamic mappings could chain, for example, a symptoms dictionary to a prescriptions dictionary whereby relevant character strings are matched between any dictionary entries and translations to dynamically chain such dictionaries together and induce an ailment to medicine mappings. A single mapping is definitive whereas a list of n mappings are prioritised accordingly and made available via the PSL feature. The number of chained dictionaries is dependent on the number and permutations of installed dictionaries.

The personal computing device interface system is also provided with a 'project mode'. When activated, the various maps between entries within respective installed dictionaries (the maps being predefined or established automatically or manually by the user during installation or run-time) allow the interface system to determine and project the most likely associations between n entries relative to the keyed, tapped or highlighted text. The most relevant, user contoured and adaptive appropriations spanning n derived sub-data strings are then displayed for selection by a user.

The personal computing device interface system maintains associative maps between data strings within two or more dictionaries, such that these maps can be used to dynamically infer associations between data strings based on statistics, probabilities and analytics (scaling patterns of use: historical usages, contextualization, associations and occurrences thereof). This allows the interface system to project and retrieve the n most likely appropriations or closely associated data strings from the dictionaries that are relevant, definitive and user oriented, and each data string being apposite to context.

Optionally, the data processing means can dynamically retrieve a list of alternative appropriations with respect to each mapped association used to induce each of the n respective data strings, whereby each list of alternative appropriations are prioritised and made available via the PSL feature. Once a longer data string is selected from the PSL, this dynamically induces and propagates a further projection and retrieval of n further data strings, each corresponding to a previous mapped association or PSL selection.

FIG. 10 shows a table of associatively mapped and prioritised data strings. The AdapTex™ personal computing device interface system can multi-map dictionary entries to other entries within the same and/or other dictionaries. These maps are based on analytics of patterns of use or correspondence between the mapped entries. These analytics are dynamic because they change priorities and switch context according to patterns of use.

Thus, a user can specify n projections whereby AdapTex™ will map entries to give n sequential appropriation lists of up to, say, five subsequent outcomes relative to a previous entry. Each subsequent appropriation list is prioritized and each can then be selected out of the five if required, most likely not since the top entry for each list will be most likely for use.

For example, if the word "Next" is keyed or tapped then the projected words (sub-data strings) shown in FIG. 10 would appear (i.e. 'generation', 'of', 'adaptive', 'intelligence', 'interfaces'). Each projected word produces a PSL (for example, the word 'generation' produces a list of other words below it) that can be toggled or scrolled through for selection when a user skips to each projection unless a user accepts the suggested projection. The PSL is in priority order of patterns of use and context switching. The spacing in the table is for clarity only and would not appear on as such on the display.

On a non-touch screen system the user would navigate to the appropriate word for changing and on a touch-screen simply tap the word with a pointing device. In either case, the PSL for that word would appear for alternative selection or replacement of the suggested word. If a suggested word is altered then the subsequent words would change dynamically, contextually as well as associatively map to the new selected word. The user can alternatively key or tap a new word from scratch over any original word selection.

On typing each letter of the word 'Next', appropriate selection lists are derived where the beginning of each list entry reflects the current typed letters. For example, keying or tapping or gesturing the letters 'Ne' would provide a list of say, 'Next, Never, Neither, Neighbour, Nederland '. From such a list the highest weighted entry would be shown, in this particular example 'Next' and the letters 'xt' would be highlighted and available for selection to complete word 'Next'.

The AdapTex™ interface system will also appropriate the word as it is keyed or tapped or gestured and dynamically change the projections according to any changes to it. This makes it much more Adaptive Intelligent than it already is. An option is provided to highlight only words within a projection that require changing and where remaining unselected words are not dynamically changeable.

Preferably the interface system could exploit the flexibility in its structure to provide projections based on true syntax, context, semantic and grammar meta data.

Continual flow from one selection to subsequent words could be provided such that a SPACE or cursor movement is adequate to perform a selection without the need to use additional select methods, i.e. a cursor movement from a highlight auto-selects the highlighted item unless another mechanism is used to do otherwise.

Optionally, the data processing means can provide manual or automatic spell check features. Optionally, the data processing means can provide a freeze point enabling the retrieval of static constant appropriations as opposed to dynamic, and which can be based on either most recent or current captured entry statistics, probabilities and analytics (scaling patterns of use: historical usages, contextualization, associations and occurrences thereof), or manually intervened prioritization or overrides.

Optionally, the data processing means can operate on any type of interface medium, keyboard and/or keypad, whether they are conventional or alternative.

Duplications are handled by prioritising the installed dictionaries whereby entries within a higher priority dictionary have precedence or are determined if manual overrides have been put in place by the user during installation or run-time configuration.

The following provides an example method to represent dictionary information, indexing and chaining as shown in FIG. 11. It also depicts an example method to represent dictionary entry information, indexing and mapping. Although RDBMS could be used, a dynamic method could use system character code tables or repertoires that come in standard ASCII, ISO, UNICODE and other formats that also include language character variants. The system character codes provide the index to each series of dictionary entries that begin with that code. Subsequent entries of the same code are dynamically generated and mapped to the previous entry in the same array for that code. Each entry holds its own statistical derivatives (i.e., timestamp, translation, expansion, frequency, length, cognitive coherence, perceptual indices, associative indices, grammar orient, correlative weights, inference ratios, pattern factorization and context probabilities etc.).

Additionally entry maps are formed to associate entries between themselves. These entry maps again are indexed using system character code tables. The system character codes provide the index to each series of entry maps that begin with that code. Subsequent maps of the same code are dynamically generated and mapped to the previous map in the same series of that code.

Dictionary chaining provides correlation and inference between dictionaries and their entries and maps. Entry mapping provides inference and association between entries and their maps.

This method allows dynamic generation of dictionaries and their variable entries and respective entry maps. It also provides an example indexing system for rapid access to entries and their associated or mapped entries. The method permits a spatial/multi-dimensional matrix to represent dictionary dynamics.

A unique aspect of the present invention is that it provides mechanisms or Application Programming Interfaces (API) that allows other software systems to utilise and benefit from all the features of this invention, and to enable improved experiences for the user with such software systems. Additional to this, the API allows other software systems data storage or information repositories to be handled by this invention in similar manner to its own dictionaries etc.

Predictive Typing Systems (PTS) do not reduce the amount of interactivity as effectively as the AdapTex™ interface system purely because the former still requires further key-presses to guide its prediction, whereas the latter simply provides discrete choices of full or partial data strings (i.e. shortcuts, whole words, phrases, or partial data strings that can be used to build up or complete fuller data strings, e.g. digraphs, tri-graphs, tetra-graphs and symbol-graphs).

The AdapTex™ personal computing device interface system has a standardised set of default dictionaries. However, additional dictionaries can be installed as standard either when the device is shipped or when users pre-install their bespoke dictionaries on setup. These new entries can be edited by the user at will.

The examples shown in FIG. 10 assume that the Adap-Tex™ interface system is in static mode, whereby the sequence/order of displayed letters associated with their respective key is depicted in conventional chronological order. Whenever in text input mode the illustrated Pop-Up selection lists are displayed according to the activating key and appropriate navigations. The Pop-Up selection lists also depict examples of the most frequently used mnemonics based on prioritizations derived from the data storage (dictionary, data string, chain or map etc.) qualitative and/or quantitative information, methods, and patterns of use or numbers relative to each letter or digit associated with its respective key.

The Pop-Up selection lists illustrated in FIG. 7 are merely examples and would otherwise dynamically depict entries within the installed dictionaries and be ordered relative to each user's patterns of use. Keys '*' and '#' also provide emoticons as well as normal functions. Pop-Up selection lists can also provide for system options. For example, keying or tapping 'S' may, in addition to displaying a filtered and prioritised list of data strings beginning with the letter 'S', also display system options such as 'send' or 'spell check'.

User typed words are entered into the AdapTex™ personal computing device interface system's data dictionary when no such entry existed beforehand. In addition, relevant data string maps, associations and contextualization parameters are also derived and maintained for all such new data string entries within the data storage means. This mechanism allows the device to adapt to the users usage and environment that dictates type and level of use. The new entries are immediately accessible by normal AdapTex™ means. Thus, the AdapTex™ personal computing device interface system adapts in real time making interaction for the user more familiar, and relative information more apparent to use and/or access.

Software application names relative to a letter on a key can be set to macro mode, thus when tapping the key the PSL gives option to start an application from its list (e.g. keys W, X, Y, Z: WORD, XCEL, YAHOO, ZANY KONG).

Optionally, one or more personal computing devices, for example a PDA, can be used as an input medium for other technologies by way of wired or wireless communications (i.e. infrared or Bluetooth® etc.). For example, one or more PDA devices can remotely be used as the keyboard for a PC by replacing the conventional PC keyboard. The dictionary synchronisation modules between the personal computing device and the PC can also control and relay data strings from the device to the PC as a default input medium for the PC, as well as synchronise dictionaries simultaneously.

Modifications and improvements may be made without departing from the scope of the present invention.

The multi-character indicia are dynamically selected to accord with a statistical extrapolation of the most used alphanumerical character combinations in a given language.

The data processing means maintains lookup chains between two or more data dictionaries such that a given data string in a first data dictionary is mapped to a data string or strings in one or more other data dictionaries for selection by the user. A given data string in a first data dictionary is mapped to a plurality of data strings in one or more other data dictionaries, said data strings are prioritised via the configuration means for ease of selection by the user.

The mapping is performed dynamically. Optionally, the data processing means maintains associative maps between any given sub-data string and up to n other sub-data strings to thus display the most relevant longer data string comprised of n+1 sub-data strings for selection by the user. A plurality of the most relevant longer data strings is displayed in a prioritised list for selection by the user. Selection of a longer data string or part of the longer data string induces a repetition of associative mapping such that a further one or more relevant longer data strings are displayed for selection by the user.

The relevance of the prioritisation of each longer data string is determined according to statistical and/or probability information stored within the data dictionaries. Statistical information relates to but is not limited to the historical inputting and/or selection of data strings. The historical inputting and/or selection information can be one or more of the following: (i) frequency of use; (ii) frequency of selection (iii) character length; (iv) lexical pattern density; and (v) chronological weighting.

Probability information can be one or more of the following: (i) occurrence and/or association ratios of two or more sub-data strings within a longer data string; (ii) context ratios determining the likelihood of a given data string being grouped with one or more other sub-data strings to determine the context of a longer data string. Optionally, the data processing means can selectively bypass or reset the dynamically updated qualitative and quantitative information. Synchronisation of data dictionaries between two or more personal computing devices can be accomplished by means of wireless connectivity.

Synchronisation of data dictionaries between two or more personal computing devices can be accomplished by means of downloading from a common database. Each data dictionary is manually populated and/or manipulated. The population of each data dictionary with data and its corresponding qualitative and/or quantitative information may be accelerated by uploading onto the data storage means data strings resident on a personal computing device or a remotely connected device. Alternatively, the dictionaries are populated by scanning external data strings by means of scanning apparatus.

The configuration means is adapted to allow a user to selectively enable or disable physical interactivity reduction characteristics of the interface system which facilitate a reduction in the number of keying or tapping events or handwriting gestures required to create a data string. The physical interactivity reduction characteristics are selected from the group comprising but not limited to:
  (i) automatically entering a space after a selected data string;
  (ii) limitation of displayed data strings to those having a total number of characters greater than the number of keying or tapping events or handwriting gestures required to display said data string on the data display means; and
  (iii) automatically performing forward or backward translations between mnemonics or abbreviations or acronyms and their corresponding full data strings.

Successive keying or tapping events or handwriting gestures act to filter further the number of data strings displayed on the data display means for subsequent selection by the user. The one or more data strings displayed on the data display means for subsequent selection by the user are displayed in list format in descending order of priority.

The invention claimed is:

1. A method for determining data strings to display on a personal computing device comprising a user interface capable of receiving inputs that are to be recognized through data input means which are receptive to keyed, tapped or a stylus input, said device being adapted to facilitate a reduction in the number of physical keying actions, tapping actions or gestures required to create a data string to less than the number of characters within said data string, comprising the steps of:
  a) storing a plurality of data strings with associated priority indicators in one or more data dictionaries, wherein each of the priority indicators is a measure of a plurality of derivatives associated with a respective one of the plurality of data strings, wherein the plurality of derivatives comprises grammar orients, cognitive coherence, and context ratios, and wherein the grammar orients, the cognitive coherence, and the context ratios are inter-related with each other such that respective weights of the grammar orients, the cognitive coherence, and the context ratios influence each other;
  b) recognizing, via the user interface, initially entered words and a first input associated with a first event following the initially entered words;
  c) determining sets of appropriations from among the plurality of data strings, wherein the sets of appropriations comprises:
    a first set comprising a plurality of predicted completions of the first input; and
    a second set comprising a plurality of projected words to follow a predicted completion from the first set, and
    wherein determining the sets of appropriations comprises:
      applying a plurality of permutations of the derivatives to a combination of the initially entered words and the first input, wherein the respective weights of the grammar orients, the cognitive coherence, and the context ratios influence each other during application of the plurality of permutations of the derivatives;
      in response to the applying, determining that at least one of the plurality of permutations of the derivatives has collapsed; and
      determining the sets of appropriations from remaining permutations of the plurality of permutations that did not collapse during application of the plurality of permutations;
  d) in response to determining the plurality of sets of appropriations, ordering at least some of the appropriations for display in a list by measuring lengths of the sets of appropriations;
  e) displaying the list to enable the user to select the required one of the appropriations;
  f) if a required one of the sets of the appropriations is included in the list, selecting the required one of the sets of the appropriations;
  g) if the required one of the sets of the appropriations is not included in the list, entering a second event and repeating steps b to e; and
  h) updating a priority indicator that is associated with the selected required appropriation if the required appropriation is selected.

2. The method of claim 1, wherein the plurality of derivatives further comprises one or more of a timestamp, a perceptual index, an associative index, a correlative weight, an inference ratio or a pattern factorisation.

3. The method of claim 1, further comprising determining the associated priority indicators from qualitative and quantitative data related to the plurality of data strings.

4. The method of claim 1, further comprising determining the associated priority indicators from one or more of the following:
  statistical information;
  probability information;
  data string analysis information;
  dictionary priority;
  dictionary chains;
  data string maps between other data strings; or
  data string translations.

5. The method of claim 1, wherein recognizing the first event comprises recognizing one or more of a character, a graph, a multi-graph, a data string, a context, a symbol or any other user or machine generated input.

6. The method of claim 1, further comprising adding data strings to the plurality of data dictionaries as they are entered by the user.

7. The method of claim 1, further comprising updating the associated priority indicators dynamically in real-time.

8. The method of claim 1, wherein each derivative of the plurality of derivatives is a different one of a plurality of behavioral language properties that measures a different one of a plurality of characteristics of one or more patterns among the plurality of data strings, and wherein the plurality of derivatives are inter-related with each other such that a weight of one of the plurality of derivatives is influenced by a weight of another of the plurality of derivatives.

9. The method of claim 1, further comprising:
  h) updating a mapping so that at least one full data string of the most likely n subsequent full data strings is mapped to a different data string based on a change in qualitative or quantitative data resulting from selecting the required one of the appropriations.

10. A personal computing device including an interface system capable of receiving inputs that are to be recognized through data input means which are receptive to keyed, tapped or a stylus type input, said device being adapted to facilitate a reduction in the number of physical keying actions, tapping actions or gestures required to create a data string to less than the number of characters within said data string, the device comprising:
  a physical memory configured to store a plurality of data strings with associated priority indicators in one or more data dictionaries, wherein each of the priority indicators is a measure of a plurality of derivatives associated with a respective one of the plurality of data strings, wherein the plurality of derivatives comprises grammar orients, cognitive coherence, and context ratios, and wherein the grammar orients, the cognitive coherence, and the context ratios are inter-related with each other such that respective weights of the grammar orients, the cognitive coherence, and the context ratios influence each other; and a data processor configured to:
recognize, via the interface system, initially entered words and a first event associated with a first input following the initially entered words;
determine sets of appropriations from among the plurality of data strings, wherein the sets of appropriations comprises:
  a first set comprising a plurality of predicted completions of the first input; and
  a second set comprising a plurality of projected words to follow a predicted completion from the first set, and in order to determine the sets of appropriations:
  apply a plurality of permutations of the derivatives to a combination of the initially entered words and the first input, wherein the respective weights of the grammar orients, the cognitive coherence, and the context ratios influence each other during application of the plurality of permutations of the derivatives;
  in response to the application, determine that at least one of the plurality of permutations of the derivatives has collapsed; and
  determine the sets of appropriations from remaining permutations of the plurality of permutations that did not collapse during application of the plurality of permutations;
in response to determination of the sets of appropriations, measure lengths of the sets of appropriations; and
determine an order in which to display the sets of appropriations based on the measured lengths;
a display configured to display a list of at least some of the appropriations according to the determined order;
wherein the data processor is further configured to:
select a required one of the appropriations in response to the required one being included in the list; and
update a priority indicator associated with the required one of the appropriations in response to the required one being selected.

11. A personal computing device according to claim 10, wherein the data input means have multi-character indicia which are dynamically selected to accord with a statistical extrapolation of the most used alphanumerical character combinations in a given language to thus facilitate a further reduction in the number of input keying actions, tapping actions or handwriting gestures required to create the data string.

12. A personal computing device according to claim 10, wherein the derivatives further include one or more of a timestamp, a perceptual index, an associative index, a correlative weight, an inference ratio or a pattern factorisation.

13. A personal computing device according to claim 10, wherein the associated priority indicators are determined from qualitative and quantitative data related to each data string of the plurality of data strings.

14. A personal computing device according to claim 10, wherein the associated priority indicators each include one or more of the following:
statistical information;
probability information;
data string analysis information;
dictionary priority;
dictionary chains;
data string maps between other data strings; or
data string translations.

15. A personal computing device according to claim 10, wherein the first event includes one or more of a character, a graph, a multi-graph, a data string, a context, a symbol or any other user or device generated input.

16. A personal computing device according to claim 10, wherein the one or more data dictionaries comprises a plurality of data dictionaries, and wherein data strings are added to the plurality of data dictionaries as they are entered by a user.

17. A personal computing device according to claim 10, wherein the priority indicators are updated dynamically in real-time.

18. A personal computing device according to claim 10, wherein the one or more data dictionaries comprises a first data dictionary and one or more other data dictionaries, wherein the data processor is further configured to order a first data string in the first data dictionary that is mapped to a plurality of other data strings in the one or more other data dictionaries based on the priority indicators to enable selection by a user.

19. A personal computing device according to claim 10, wherein the most likely n subsequent full data strings are ordered based on the priority indicators to enable the user to select the required one of the appropriations.

20. A personal computing device according to claim 10, wherein the data processor is further configured to allow a user to selectively enable or disable physical interactivity reduction characteristics of the interface system which facilitate a reduction in the number of key presses required to create a data string.

21. A personal computing device according to claim 20, wherein the physical interactivity reduction characteristics are selected from the group comprising but not limited to:
automatically entering a space after a selected data string;
limitation of displayed mnemonics to those having a total number of characters greater than the number of key presses required to display said mnemonic on the data display means;
automatically performing forward or backward translations between mnemonics or abbreviations or acronyms and their corresponding full data strings;
prioritization of data strings created by any given data input key having multi-character indicia, said prioritization being based on selected qualitative and/or quantitative information relating to an initial character which matches only one of the indicia on the data input key; and
prioritization of data strings created by any given data input key having multi-character indicia, said prioritization being based on selected qualitative and/or quantitative information relating to an initial character, which matches any of the indicia on the data, input key.

22. The personal computing device of claim 10, wherein the data input means are capable of being displayed on a representation of a QWERTY keyboard.

23. The personal computing device of claim 10, wherein the data input means are capable of being displayed on a representation of a DVORAK or MALTRON® keyboard.

24. The personal computing device of claim 10, wherein each derivative of the plurality of derivatives is a different one of a plurality of behavioral language properties that measures a different one of a plurality of characteristics of one or more patterns among the plurality of data strings, and wherein the plurality of derivatives are inter-related with each other such that a weight of one of the plurality of derivatives is influenced by a weight of another of the plurality of derivatives.

25. The personal computing device of claim 10, wherein the data processor is further configured to update a mapping so that at least one full data string of the most likely n subsequent full data strings is mapped to a different data string based on a change in qualitative or quantitative data resulting from the selection of the required one of the appropriations.

* * * * *